US010462222B2

(12) United States Patent
Wolfram et al.

(10) Patent No.: US 10,462,222 B2
(45) Date of Patent: *Oct. 29, 2019

(54) CLOUD STORAGE METHODS AND SYSTEMS

(71) Applicant: Wolfram Research, Inc., Champaign, IL (US)

(72) Inventors: Stephen Wolfram, Concord, MA (US); Bradley Ashby, Champaign, IL (US)

(73) Assignee: Wolfram Research, Inc., Champaign, IL (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/589,266

(22) Filed: May 8, 2017

(65) Prior Publication Data

US 2017/0242864 A1 Aug. 24, 2017

Related U.S. Application Data

(63) Continuation of application No. 14/872,129, filed on Sep. 30, 2015, now Pat. No. 9,646,003, which is a
(Continued)

(51) Int. Cl.
*G06F 16/178* (2019.01)
*H04L 29/08* (2006.01)
(Continued)

(52) U.S. Cl.
CPC ........... *H04L 67/1097* (2013.01); *G06F 8/60* (2013.01); *G06F 9/445* (2013.01); *G06F 9/546* (2013.01);
(Continued)

(58) Field of Classification Search
None
See application file for complete search history.

(56) References Cited

U.S. PATENT DOCUMENTS 6,314,415 B1 11/2001 Mukherjee
6,342,907 B1 1/2002 Petty et al.
(Continued)

OTHER PUBLICATIONS

Barnett, "Making the World's Knowledge Computable," Jun. 7, 2011, retrieved from http://www.telegraph.co.uk/technology/news/8561619/Wolfram-Alpha-creator-plans-to-delete-the-PDF.html on Jan. 20, 2016.
(Continued)

*Primary Examiner* — Philip Wang
(74) *Attorney, Agent, or Firm* — Drinker Biddle & Reath LLP

(57) ABSTRACT

A system receives one or more messages corresponding to a request to add data to an electronic storage object that is accessible on a network, the one or more messages corresponding to the electronic storage object to which data is to be stored, and including raw data corresponding to the data that is to be stored. Responsive to the one or more messages, the system: locates the electronic storage object in a database, identifies data conversion metadata in the electronic storage object that indicates how the raw data is to be converted to formatted data in a format that is recognized by a computational application, uses the data conversion metadata to convert the raw data to the formatted data in the format recognized by the computational application, and stores the formatted data to the electronic storage object in the database.

37 Claims, 19 Drawing Sheets

Related U.S. Application Data continuation-in-part of application No. 14/549,541, filed on Nov. 20, 2014, now Pat. No. 9,619,217.

(60) Provisional application No. 61/906,888, filed on Nov. 20, 2013.

(51) Int. Cl.

| | | |
|---|---|---|
| *G06F 16/00* | (2019.01) | |
| *G06F 16/16* | (2019.01) | |
| *G06F 16/11* | (2019.01) | |
| *G06F 16/13* | (2019.01) | |
| *G06F 16/182* | (2019.01) | |
| *G06F 8/60* | (2018.01) | |
| *G06F 9/445* | (2018.01) | |
| *G06F 9/54* | (2006.01) | |
| *G06F 16/27* | (2019.01) | |
| *H04L 29/06* | (2006.01) | |

(52) U.S. Cl.
CPC ............ *G06F 16/00* (2019.01); *G06F 16/116* (2019.01); *G06F 16/134* (2019.01); *G06F 16/16* (2019.01); *G06F 16/182* (2019.01); *G06F 16/27* (2019.01); *H04L 67/42* (2013.01)

(56) References Cited

U.S. PATENT DOCUMENTS

| | | | |
|---|---|---|---|
| 6,889,260 B1* | 5/2005 | Hughes | G06F 16/258 |
| | | | 709/246 |
| 7,010,796 B1 | 3/2006 | Strom et al. | |
| 8,261,295 B1 | 9/2012 | Risbood et al. | |
| 8,589,869 B2 | 11/2013 | Wolfram | |
| 8,645,490 B2 | 2/2014 | Christensen | |
| 9,069,814 B2 | 6/2015 | Wolfram et al. | |
| 2002/0083072 A1* | 6/2002 | Steuart | G06F 16/258 |
| 2004/0233236 A1 | 11/2004 | Yang | |
| 2006/0116991 A1 | 6/2006 | Calderwood | |
| 2008/0222192 A1* | 9/2008 | Hughes | G06F 16/258 |
| 2012/0306898 A1* | 12/2012 | Scheidhauer | G06F 3/14 |
| | | | 345/522 |
| 2013/0125094 A1 | 5/2013 | Wolfram et al. | |
| 2014/0164315 A1 | 6/2014 | Golshan | |
| 2014/0280323 A1 | 9/2014 | Seales | |
| 2015/0142858 A1* | 5/2015 | Bryan | G06F 9/5088 |
| | | | 707/809 |
| 2015/0154012 A1 | 6/2015 | Wolfram | |
| 2015/0169679 A1 | 6/2015 | Wolfram et al. | |
| 2015/0186193 A1 | 7/2015 | Jain et al. | |
| 2015/0295781 A1 | 10/2015 | Maes | |
| 2016/0026438 A1 | 1/2016 | Wolfram | |
| 2017/0212737 A1 | 7/2017 | Wolfram et al. | |
| 2017/0220542 A1 | 8/2017 | Wolfram et al. | |
| 2017/0242835 A1 | 8/2017 | Wolfram et al. | |
| 2017/0244789 A1 | 8/2017 | Wolfram et al. | |
| 2018/0004721 A1 | 1/2018 | Wolfram et al. | |

OTHER PUBLICATIONS

"Parse," Wikipedia entry (2 pages); retrieved from https://en.wikipedia.org/wiki/Parse_(company) on May 5, 2017.

"Providing a URl for a remote file," Sep. 22, 2012, retrieved from http://web.archive.org/web/20120922194818/http://www.java2s.come/Tutorial/Java/0180_File/ProvidingaURlforaremotefile.htm on Feb. 22, 2016.

Williams, "Appcelerator Acquires Singly, a Developer Platform for Integrating Third-Party Services," techcrunch.com, posted Aug. 22, 2013 (2 pages), retrieved from https://techcrunch.com/2013/08/22/appcelerator-acquires-singly-a-developer-platform-for-integrating-third-party-services/ on May 5, 2017.

"MaskedTextBox.ValidatingType Property," Microsoft Developer Network, Jun. 21, 2014 (3 pages); available at https://msdn.microsoft.com/en-us/library/system.windows.forms.maskedtextbox.validatingtype(v=vs.110) aspx (last accessed Jun. 28, 2018).

analysistabs.com, "Calculator Using Excel VBA UserForm," available at https://analysistabs.com/vba-code/excel-projects/calculator-userform, accessed Jan. 2, 2018, 16 pages (Dec. 24, 2015).

Familiar, "Mlcroservices, IoT, and Azure: Leveraging DevOps and Microservice Architecture to Delivery SaaS Solutions," Apress, 4 pages (2015).

Walkenbach, "Excel 2013 Power Programming with VBA," John Wiley & Sons, 10 pages (2013).

* cited by examiner

In[1]:=bin = CreateDatabin[]

Out[1]:=

In[1]:=bin = CreateDatabin["Interpretation" -> {"city"-> "City", "temp"-> Restricted["StructuredQuantity", "DegreesCelsius"]}]

Out[1]:=

In[1]:=bin = CreateDatabin[<|"Name" -> "My new data bin"|>]

Out[1]:=

In[1]:=bin = CreateDatabin[<|"Permissions" -> "Private"|>]

Out[1]:=

In[2]:= DatabinAdd[bin, 1234]

Out[2]:=

In[2]:=bin = Databin[bin, <|"city"-> "nyc", "temp"-> 20.4|>]

Out[2]:=

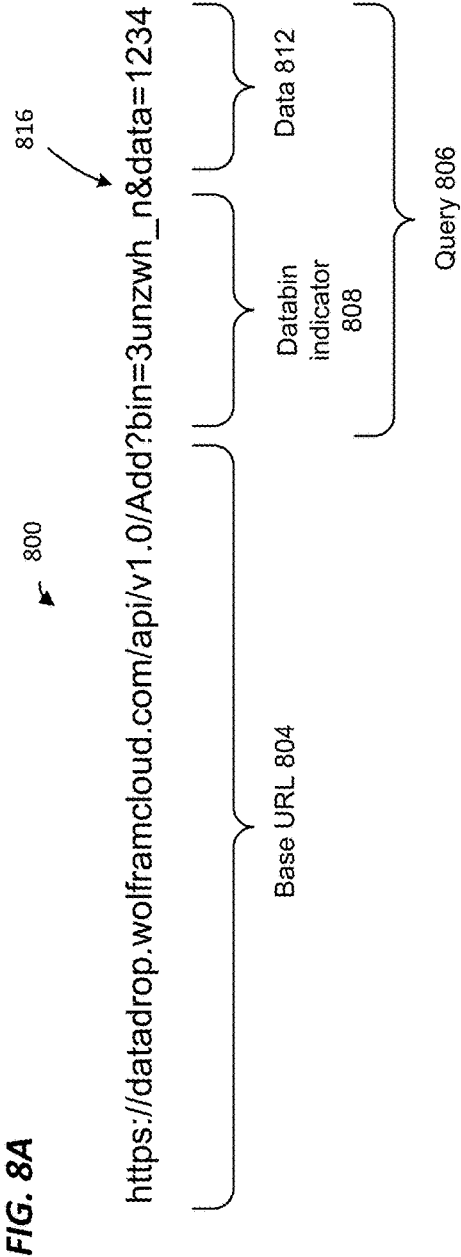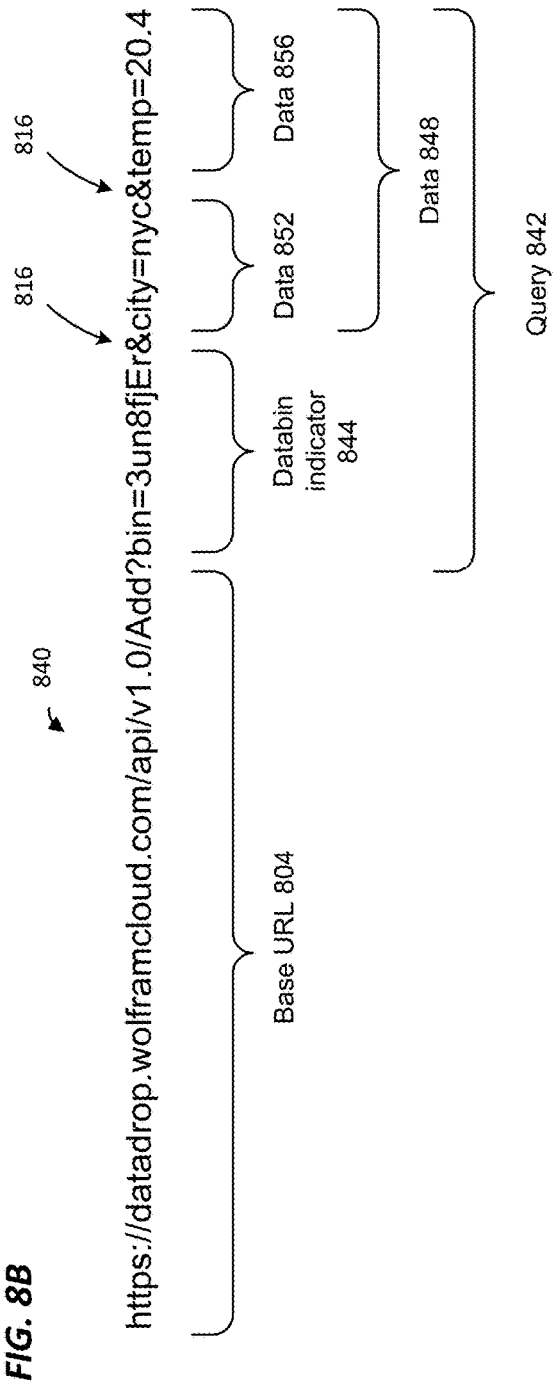

In[1]:=bin = Databin["3pw3N73Q"]

In[2]:=Histogram[bin]

Out[2]:=

In[3]:=MinMax[Values[Databin["3pw3N73Q"]]["temperature"]]

Out[3]:= {14.8408 °C, 26.82707 °C}

CloudDeploy[FormFunction[{(first, "Meal") -> {"Breakfast", "Lunch", "Dinner"}, (second, "Calories") -> "Integer", DatabinAdd[2ByCOJLK, <|"Meal" -> first, "Calories" -> second|>]]]

Meal | Breakfast ▲
     | Lunch
     | Dinner

1758

Calories | [          ]

Submit

1762

CLOUD STORAGE METHODS AND SYSTEMS

CROSS-REFERENCES TO RELATED APPLICATIONS

The present application is a continuation of U.S. patent application Ser. No. 14/872,129, entitled "Cloud Storage Methods and Systems," filed Sep. 30, 2015, which is a continuation-in-part of U.S. patent application Ser. No. 14/549,541, entitled "Methods and Systems for Cloud Computing," filed Nov. 20, 2014, which claims the benefit of U.S. Provisional Application No. 61/906,888, entitled "Cloud Computing Platform," filed on Nov. 20, 2013. All of the applications referenced above are hereby incorporated by reference herein in their entireties.

FIELD OF THE DISCLOSURE

The present disclosure generally relates to cloud computing, and more particularly, systems that enable adding data to and retrieving data from objects in cloud storage, and processing the retrieved data.

BACKGROUND

The present availability of high-capacity networks, computing power, and storage, as well as the widespread adoption of hardware virtualization, service-oriented architecture, and autonomic and utility computing have led to a growth in cloud computing.

In cloud computing, multiple remote servers (usually a large number) are networked to allow centralized data storage and online access to computer services or resources. Cloud resources are typically shared by multiple users and also dynamically reallocated based on demand.

Software as a service (SaaS) is a category of cloud computing services in which software is centrally hosted and provided as a service. SaaS is typically accessed by users using a thin client via a web browser. Typically, a single version of the application is used for all customers, although customization of the application may be accomplished by selecting from a set of predefined configuration options. Thus, SaaS systems are inflexible.

Platform as a Service (PaaS) is a category of cloud computing services in which a computing platform and a solution stack are provided as a service. In PaaS, a provider provides a user with tools and/or libraries for creating an application or service to be hosted on the provider's platform, i.e., servers, storage, and other services that are required to host users' applications. Since PaaS systems typically support only a limited number of programming languages and frameworks, however, adopting a PaaS system may require utilizing an unfamiliar language and/or programming framework.

Online file storage, or cloud storage, allows a user to store files on a remote server or servers and later access the files. For example, a user can upload files, and the files can later be accessed over the Internet from the same computer or a different computer, by the same user or sometimes by other users. Many cloud storage providers utilize an object storage architecture that manages data as objects.

SUMMARY OF THE DISCLOSURE

In an embodiment, a method for creating a cloud storage object for storing data includes receiving, at one or more processors, programmer input in a programming language, the programmer input for creating an electronic storage object, the programmer input including a built-in function of the programming language, the built-in function corresponding to creating storage objects that are accessible on a network, wherein the programmer input is received in a document, and a computational application is configured to i) evaluate built-in functions of the programming language within the document, and ii) perform data processing operations on data in the document. The method also includes evaluating, at one or more processors, the programmer input with the computational application to generate one or more application programming interface (API) calls for requesting a server to create the electronic storage object so that the electronic storage object is made accessible via the network. The method further includes, responsive to the one or more API calls, receiving, at one or more processors, an identifier (ID) corresponding to the electronic storage object, the ID for enabling access to the electronic storage object via the network.

In another embodiment, a system comprises: a user interface device; a network interface device configured to support communications via a communication network; one or more processors coupled to the user interface device and the network interface device; and one or more memory devices coupled to the one more processors. The one or more memory devices store machine readable instructions that, when executed by the one or more processors, cause the one or more processors to: receive programmer input in a programming language via the user interface device, the programmer input for creating an electronic storage object, the programmer input including a built-in function of the programming language, the built-in function corresponding to creating storage objects that are accessible on the communication network or another communication network, wherein the programmer input is received in a document, and a computational application is configured to i) evaluate built-in functions of the programming language within the document, and ii) perform data processing operations on data in the document. The one or more memory devices further store machine readable instructions that, when executed by the one or more processors, cause the one or more processors to: evaluate the programmer input with the computational application to generate one or more application programming interface (API) calls for requesting a server to create the electronic storage object so that the electronic storage object is made accessible via the network; cause the network interface device to send the one or more API calls to the server via the communication network; and responsive to the one or more API calls, receive from the server an identifier (ID) corresponding to the electronic storage object, the ID for enabling access to the electronic storage object via the communication network or the other communication network, the ID received from the server via the network and via the network interface device.

In yet another embodiment, a method for creating a cloud storage object for storing data includes: receiving, at one or more processors, one or more application programming interface (API) calls requesting creation of an electronic storage object that is accessible on a network, the one or more API calls including i) an indication of the request to create the electronic storage object, and ii) one or more parameters indicating how data subsequently received by a server for storage in the electronic storage object is to be interpreted by a computational application; and responsive to the one or more API calls, creating, with one or more processors, the electronic storage object so that the electronic storage object is accessible on the network, including: storing metadata in the electronic storage object that indicates how the data subsequently received by the server for storage in the electronic storage object is to be interpreted by the computational application, determining an identifier (ID) for the electronic storage object, and associating the ID with a location of the electronic storage object in a database so that the electronic storage object can be located by the server using the ID; and responsive to the one or more API calls, sending the ID to a sender of the one or more API calls.

In still another embodiment, a system comprises: a network interface device configured to support communications via a communication network; a network-accessible computer storage system; one or more processors coupled to the network interface device and the network-accessible computer storage system; and one or more memory devices coupled to the one more processors. The one or more memory devices store machine readable instructions that, when executed by the one or more processors, cause the one or more processors to: receive, via the network interface device, one or more application programming interface (API) calls requesting creation of an electronic storage object that is accessible on the communication network or another communication network, the one or more API calls including i) an indication of the request to create the electronic storage object, and ii) one or more parameters indicating how data subsequently received by the system for storage in the electronic storage object is to be interpreted by a computational application. The one or more memory devices further store machine readable instructions that, when executed by the one or more processors, cause the one or more processors to, responsive to the one or more API calls, create the electronic storage object in the network-accessible computer storage system so that the electronic storage object is accessible on the communication network or the other communication network, including: storing metadata in the electronic storage object that indicates how the data subsequently received by the system for storage in the electronic storage object is to be interpreted by the computational application, determining an identifier (ID) for the electronic storage object, and associating the ID with a location of the electronic storage object in the network-accessible computer storage system so that the electronic storage object can be located by the server using the ID, and responsive to the one or more API calls, sending the ID to a sender of the one or more API calls via the communication network and via the network interface device.

In another embodiment, a method for adding data to a cloud storage object, the method comprising: receiving, at one or more processors, programmer input in a programming language, the programmer input for adding data to an electronic storage object that is accessible via a network, the programmer input including i) a built-in function corresponding to adding data to electronic storage objects, ii) a first parameter specifying the electronic storage object to which data is to be stored, and iii) one or more second parameters indicating the data that is to be stored; and evaluating, at one or more processors, the programmer input with a computational application to generate one or more messages to a server for the server to add the data to the electronic storage object; and sending, with one or more processors, the one or more messages to cause the data indicated by the second parameter to be added to the electronic storage object.

In still another embodiment, a system comprises: a user interface device; a network interface device configured to support communications via a communication network; one or more processors coupled to the user interface device and the network interface device; and one or more memory devices coupled to the one more processors. The one or more memory devices store machine readable instructions that, when executed by the one or more processors, cause the one or more processors to: receive, via the user interface device, programmer input in a programming language, the programmer input for adding data to an electronic storage object that is accessible via the communication network or another communication network, the programmer input including i) a built-in function corresponding to adding data to electronic storage objects, ii) a first parameter specifying the electronic storage object to which data is to be stored, and iii) one or more second parameters indicating the data that is to be stored. The one or more memory devices further store machine readable instructions that, when executed by the one or more processors, cause the one or more processors to: evaluate the programmer input with a computational application to generate one or more messages corresponding to a request for a server to add the data to the electronic storage object, and send, via the network interface device and the communication network, the one or more messages to cause the data indicated by the second parameter to be added to the electronic storage object.

In yet another embodiment, a method for adding data to a cloud storage object for storing data includes: receiving, at one or more processors, one or more messages corresponding to a request to add data to an electronic storage object that is accessible on a network, the one or more messages corresponding to the electronic storage object to which data is to be stored, and including raw data corresponding to the data that is to be stored. The method also includes, responsive to the one or more messages: locating, at one or more processors, the electronic storage object in a database corresponding to the parameter, identifying, at one or more processors, data conversion metadata in the electronic storage object that indicates how the raw data is to be converted to formatted data in a format that is recognized by a computational application, using the data conversion metadata to convert, at one or more processors, the raw data to the formatted data in the format recognized by the computational application, and storing the formatted data to the electronic storage object in the database.

In an embodiment, a system comprises: a network interface device configured to support communications via a communication network; a network-accessible computer storage system; one or more processors coupled to the network interface device and the network-accessible computer storage system; and one or more memory devices coupled to the one more processors. The one or more memory devices store machine readable instructions that, when executed by the one or more processors, cause the one or more processors to: receive, via the network interface device, one or more messages corresponding to requests to add data to an electronic storage object that is accessible on a network, the one or more messages corresponding to the electronic storage object to which data is to be stored, and including raw data corresponding to the data that is to be stored. The one or more memory devices further store machine readable instructions that, when executed by the one or more processors, cause the one or more processors to, responsive to the one or more messages: locate the electronic storage object in the network-accessible computer storage system using the first parameter, identify data conversion metadata in the electronic storage object that indicates how the raw data is to be converted to formatted data in a format that is recognized by a computational application, use the data conversion metadata to convert the raw data to the formatted data in the format recognized by the computational application, and store the formatted data to the electronic storage object in the network-accessible computer storage system.

In still another embodiment, a method for retrieving data from a cloud storage object includes: receiving, at one or more processors, programmer input in a programming language, the programmer input for retrieving data from a user-created electronic storage object that is accessible via a network, the programmer input including i) a built-in function of a computational application, the built-in function corresponding to retrieving data from electronic storage objects, and ii) a first parameter specifying the electronic storage object from which data is to be retrieved. The programmer input is received in a document, and the computational application is configured to i) evaluate built-in functions of the computational application within the document, and ii) perform data processing operations on data in the document. The method also includes evaluating, at one or more processors, the programmer input with the computational application to generate one or more messages corresponding to requests for a server to retrieve data from the electronic storage object; sending, with one or more processors, the one or more messages to cause the server to retrieve data from the electronic storage object; receive, at the one or more processors, data retrieved from the electronic storage object by the server. The method further includes making the retrieved data, with the one or more processors, available in the document for processing by the computational application, wherein the retrieved data is in a format recognized by the computational application.

In yet another embodiment, a system comprises: a user interface device; a network interface device configured to support communications via a communication network; one or more processors coupled to the user interface device and the network interface device; and one or more memory devices coupled to the one more processors, the one or more memory devices storing machine readable instructions that, when executed by the one or more processors, cause the one or more processors to: implement a computational application, and receive, via the user interface device, programmer input in a programming language, the programmer input for retrieving data from a user-created electronic storage object that is accessible via the communication network, the programmer input including i) a built-in function of the computational application, the built-in function corresponding to retrieving data from electronic storage objects, and ii) a first parameter specifying the electronic storage object from which data is to be retrieved, wherein the programmer input is received in a document, and the computational application is configured to i) evaluate built-in functions of the computational application within the document, and ii) perform data processing operations on data in the document. The one or more memory devices further store machine readable instructions that, when executed by the one or more processors, cause the one or more processors to: evaluate the programmer input with the computational application to generate one or more messages corresponding to requests for a server to retrieve data from the electronic storage object, send, via the network interface device, the one or more API calls to cause the server to retrieve data from the electronic storage object, receive, via the network interface device, data retrieved from the electronic storage object by the server, and make the retrieved data available in the document for processing by the computational application, wherein the retrieved data is in a format recognized by the computational application.

In an embodiment, a method for retrieving data from a cloud storage object for storing data includes: receiving, at one or more processors, one or more messages corresponding to requests to access data in a user-created electronic storage object that is accessible on a network, the one or more messages corresponding to the electronic storage object from which data is to be accessed; and responsive to the one or more messages: locating, at one or more processors, the electronic storage object in a database based on the one or more messages, retrieving, at the one or more processors, data from the electronic storage object; and forwarding, with the one or more processors, the retrieved data in a format recognized by a computational application, the retrieved data forwarded to a computer via a communication network, wherein the computer executes the computational application.

In another embodiment, a system comprises: a network interface device configured to support communications via a communication network; a network-accessible computer storage system; one or more processors coupled to the network interface device and the network-accessible computer storage system; and one or more memory devices coupled to the one more processors. The one or more memory devices store machine readable instructions that, when executed by the one or more processors, cause the one or more processors to: receive first messages corresponding to requests to add data to a plurality of electronic storage objects that are accessible on the communication network or another communication network, each first message corresponding to the electronic storage object to which data is to be stored, and including respective raw data corresponding to the respective data that is to be stored, wherein the first messages corresponds to requests to add data from multiple different applications. The one or more memory devices further store machine readable instructions that, when executed by the one or more processors, cause the one or more processors to: responsive to the first messages: locate electronic storage objects in the network-accessible computer storage system based on the first messages, identify respective data conversion metadata in the electronic storage objects that indicate how the raw data is to be converted to formatted data in a format that is recognized by a computational application, use the data conversion metadata to convert, at one or more processors, the raw data to the formatted data in the format recognized by the computational application, and store the formatted data to the electronic storage objects in the database. The one or more memory devices further store machine readable instructions that, when executed by the one or more processors, cause the one or more processors to: receive second messages corresponding to requests to access data in the electronic storage objects, the second messages corresponding to electronic storage objects, the second messages being received from a plurality of instances of the computational application executing on one or more processors; and responsive to the second messages: locate respective electronic storage objects in the network-accessible computer storage system based on the second messages, retrieve data from the electronic storage objects; and forward the retrieved data in the format recognized by the computational application to the plurality of instances of the computational application.

BRIEF DESCRIPTION OF THE DRAWINGS

FIG. 8A illustrates an example web application programming interface (API) call for adding data to a cloud storage object, according to an embodiment.

FIG. 8B illustrates another example web API call for adding data to a c, according to another embodiment.

FIG. 17A is an example of programmer input utilized to create and deploy a web form for accepting data and then storing the data to a cloud storage object, according to an embodiment.

FIG. 17B is an example web form created based on the programming input of FIG. 17A, according to an embodiment.

DETAILED DESCRIPTION

Figure 1:
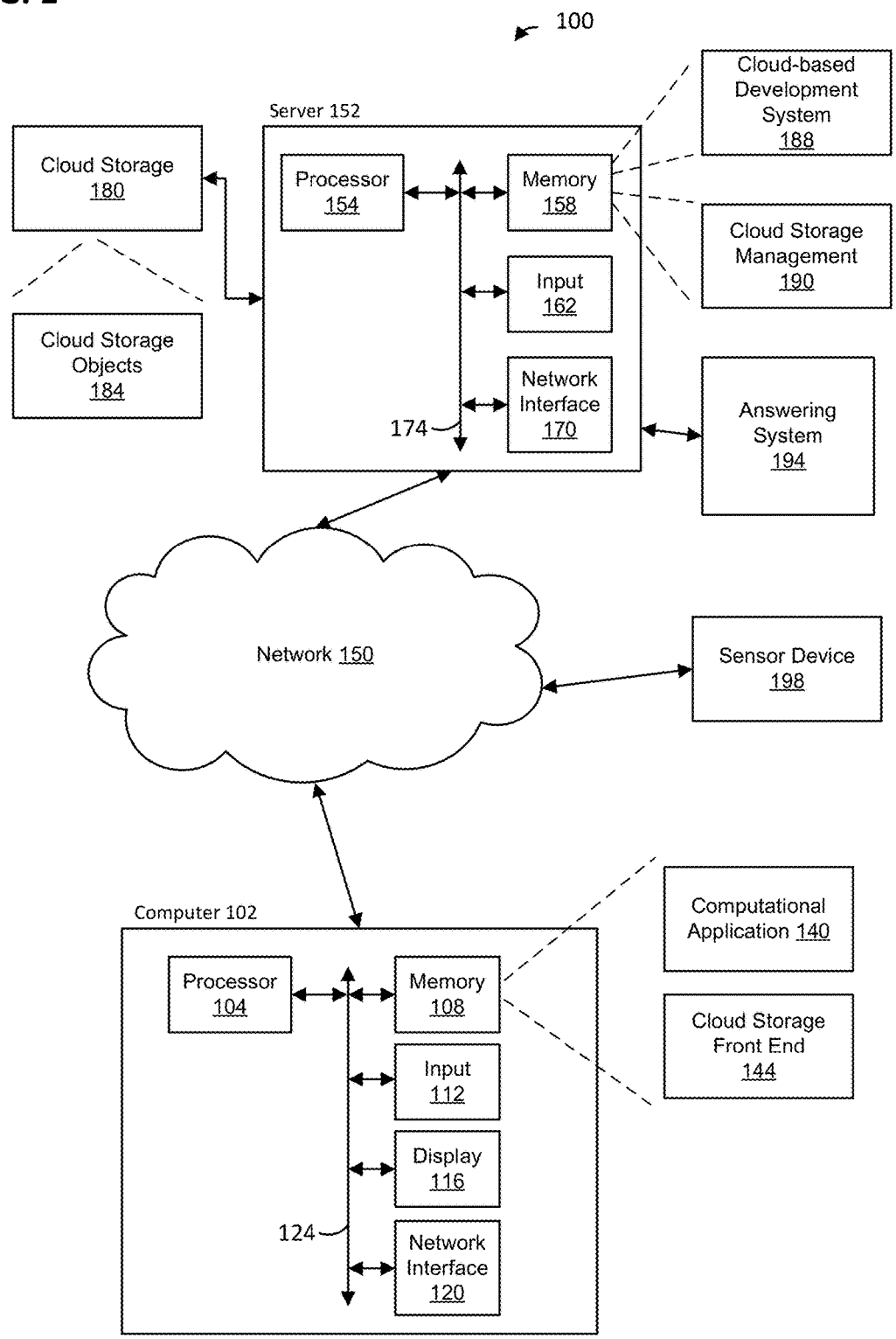
FIG. 1 is a diagram of an example system for a cloud-based storage system, according to an embodiment.

FIG. 1 is a diagram of an example system 100 for creating storage objects, modifying the objects (e.g., adding data to, changing data in, removing data from, etc., the objects), and/or retrieving data from the objects, according to an embodiment. The system 100 may make storage objects privately and/or publicly available via a network such as an intranet, an extranet, a wide area network (WAN), the Internet, etc. In various embodiments, the system 100 facilitates creation of objects that can be accessed via a network, modifying already created objects via the network (e.g., adding data to already created objects via a network, removing data from already created objects via a network, changing data in already created objects via a network, etc.), reading data from already created objects via the network, etc. The storage objects described herein are termed "cloud storage objects" to emphasize that the storage objects are accessible via a network.

In some embodiments, the system 100 is configured to format cloud storage objects in a unified format recognized by a computational application, such that cloud storage objects can include data of a variety of types and such that the computational application can readily process the data in the variety of types, which are recognized by the computational application. For example, in one embodiment, the computational application is the MATHEMATICA® computational system, which is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® utilizes the Wolfram Language™, which is an interpreted language, and evaluates symbolic expressions that are expressed using the Wolfram Language™. In some embodiments, evaluation of a symbolic expression involves applying to the symbolic expression all transformation rules that fit that expression.

In an embodiment, the system 100 includes one or more computers, such as a computer 102. The computer 102 includes one or more processors 104 and one or more memory devices 108. The computer 102 also includes, or is coupled to, one or more input devices 112. Additionally, the computer 102 includes, or is coupled to, one or more display devices 116. In some embodiments, the computer 102 includes one or more network interface devices 120. The one or more processors 104, the one or more memory devices 108, the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), etc., may be communicatively coupled via one or more busses 124 (sometime referred to herein as "the bus 124" for brevity).

In other embodiments, the computer 102 may have other suitable structures and/or components.

The one or more processors 104 (sometime referred to herein as "the processor 104" for brevity) may comprise one or more general purpose processors (e.g., a central processing unit), one or more special purpose processors (e.g., a co-processor, a graphics processor, etc.). At least one of the one or more processors 104 executes machine readable instructions stored in the memory 108. The one or more memory devices 108 (sometime referred to herein as "the memory 108" for brevity) include one or more of random access memory (RAM), read only memory (ROM), a FLASH memory, a magnetic disk drive, an optical disk drive, etc.

The one more input devices 112 include one or more suitable input devices such as a keyboard, a key pad, a mouse, a trackball, one or more buttons, a touch screen that overlays a display device, etc. The one or more network interface devices 120 comprise one or more suitable network interface devices (NICs) such as a wired network NIC, a wireless network NIC, etc.

In some embodiments, the memory 108 may store a computational application 140 such as the MATHEMATICA® computational application from Wolfram Research, Inc., a spreadsheet application, etc., where the computational application 140 is configured to cause a cloud server system (discussed in more detail below) to create cloud storage objects and/or to modify cloud storage objects. For example, in an embodiment, the computational application 140 may include a cloud storage front end 144 that enables creation and/or modification of cloud storage objects (via interaction with the cloud server system), according to various embodiments. In some embodiments, the computational application 140 is configured to provide an electronic user interface such as a workspace (e.g., a notebook, a spreadsheet, a document, etc.) in which a user can enter software code and/or functions to be evaluated, cause the functions to be evaluated, and/or view results of the evaluations. In some embodiments, a user can enter software code and/or functions in the workspace, where the software code and/or functions cause the cloud server system to create cloud storage objects and/or to modify cloud storage objects.

In some embodiments, however, the computational application 140 is omitted and the cloud storage front end 144 is a standalone application and/or module. In some embodiments, the cloud storage front end 144 is incorporated into another suitable application different than the computational application 140. In some embodiments, the cloud storage front end 144 is a web browser, and a user can cause the cloud server system to create cloud storage objects and/or to modify cloud storage objects via the web browser. In some embodiments, the cloud storage front end 144 is a communication application (e.g., an email application, a text messaging application, etc.), and a user can cause the cloud server system to modify cloud storage objects via the communication application, as will be discussed in more detail below. If other computers (not shown) similar to the computer 102 are included, one or more of the other computers may include respective cloud storage front ends 144.

In various embodiments, the computer 102 comprises a desktop computer, a workstation, a laptop computer, a tablet computer, a smart phone, a personal digital assistant, a gaming system, a server, etc. If other computers (not shown) similar to the computer 102 are included, the other computers may be of various types.

In some embodiments, the computer 102 (and, optionally, one or more other computers) is coupled to a network 150. The network 150 may comprise one or more of a local area network (LAN), a wide area network (WAN), a metropolitan area network (MAN), a mobile communications network, an intranet, an extranet, the Internet, etc.

In some embodiments, the system 100 may include one or more servers such as the server 152. FIG. 1 illustrates a single server 152 for brevity, but the system 100 includes multiple other similarly configured servers in some embodiments. In some embodiments, multiple servers (including the server 152) are networked together to provide online access to data storage via the network 150. One server 152 will be discussed in detail with respect to FIG. 1, and other servers (if included) have the same or a similar suitable structure, in some embodiments.

The server 152 includes one or more processors 154 and one or more memory devices 158. The server 152 also may include, or be coupled to, one or more input devices 162. The server 152 includes one or more network interface devices 170. The one or more processors 154, the one or more memory devices 158, the one or more input devices 162 (sometime referred to herein as "the input device 162" for brevity), the one or more network interface devices 170 (sometime referred to herein as "the network interface device 170" for brevity), etc., may be communicatively coupled via one or more busses 174 (sometime referred to herein as "the bus 174" for brevity). In other embodiments, the server 152 may have other suitable structures and/or components.

The one or more processors 154 (sometime referred to herein as "the processor 154" for brevity) may comprise one or more general purpose processors (e.g., a central processing unit), one or more special purpose processors (e.g., a co-processor, a graphics processor, etc.). At least one of the one or more processors 154 executes machine readable instructions stored in the memory 158. The one or more memory devices 158 (sometime referred to herein as "the memory 158" for brevity) include one or more of random access memory (RAM), read only memory (ROM), a FLASH memory, a magnetic disk drive, an optical disk drive, etc.

The one more input devices 162 include one or more suitable input devices such as a keyboard, a key pad, a mouse, a trackball, one or more buttons, a touch screen that overlays a display device, etc. The one or more network interface devices 170 comprise one or more suitable NICs such as a wired network NIC, a wireless network NIC, etc. The server 152 is communicatively coupled to the computer 102 and other computers (not shown) via the communication network 150. The server 152 may be communicatively coupled to other cloud servers (not shown) via another network (not shown) and/or the network 150, in various embodiments.

Additionally, in some embodiments, the server 152 may be communicatively coupled to a cloud storage database system 180, which may comprise one or more suitable databases. The cloud storage database system 180 stores objects (e.g., cloud storage objects) 184 that are accessible, via the server 152 or another server, to computers (e.g., the computer 102) via the network 150.

In an embodiment, the memory 158 may store a cloud-based development system 188. In various embodiments, the cloud-based development system 188 is configured to interface with the cloud storage front end 144 to create cloud storage objects 184 in the cloud storage database 180, to modify cloud storage objects 184, and/or to make cloud storage objects 184 in the cloud storage database 180 accessible to computers via the network 150. In some embodiments, the cloud-based development system 188 includes a cloud storage management module 190 that is configured to interface with the cloud storage front end 144 to create cloud storage objects 184 in the cloud storage database 180, to modify cloud storage objects 184, and/or to make cloud storage objects 184 in the cloud storage database 180 accessible to computers via the network 150. In some embodiments, the cloud storage management module 190 is a standalone module separate from the cloud-based development system 188. In some embodiments, the cloud storage management module 190 is a component of a system different than the cloud-based development system 188. In some embodiments, the cloud-based development system 188 may be omitted.

In some embodiments, the computational application 140 is implemented as a kernel running on the server 152 and a front end running on the computer 102. In such embodiments, the cloud-based development system 188 includes the kernel. In some embodiments, the computational application 140 is included in the cloud-based development system 188 and the computer 102 runs a thin client such as a web browser. In some embodiments, aspects of the computational application 140 running on the server 152 (e.g., the kernel) are separate from the cloud-based development system 188. In some embodiments, the cloud-based development system 188 is configured as described in U.S. patent application Ser. No. 14/549,541, filed Nov. 20, 2014, which is hereby incorporated by reference herein.

In some embodiments, the server 152 may be communicatively coupled to an answering system and/or natural language processing system 194 (hereinafter "answering system 190") such as described in U.S. Pat. No. 8,589,869 and/or U.S. patent application Ser. No. 13/678,168, filed Nov. 15, 2012, which are hereby incorporated by reference herein in their entireties. In some embodiments, the cloud-based development system 188 may interface with the answering system 194 and utilize natural language processing capabilities of the answering system 194 to process user input, for example. In some embodiments, the cloud storage management module 190 may interface with the answering system 194 and utilize natural language processing capabilities of the answering system 194 to process user input, for example. In some embodiments, the server 152 may be communicatively coupled to the answering system 194 via the network 150 or another suitable communication network separate from the network 150.

In some embodiments, the server 152 utilizes virtualization techniques.

In some embodiments, the system 100 includes a sensor device 198 communicatively coupled to the network 150. The sensor device 198 includes one or more sensors for measuring real world physical parameters such as temperature, pressure, sound, motion, light, speed, acceleration, geographic position, physical orientation, etc. In various embodiments, the sensor device 194 may be a standalone device, or may be included in another device or system such as a still photo camera, a video camera, a security system, an air conditioning/heating control system, etc.

The sensor device 198 also includes one or more processors and one or more memories coupled to one or more busses (not shown), and has a structure generally similar to the computer 102, but having one or more sensors coupled to the bus(ses) and optionally omitting one or more components of the computer 102, such as a display and/or an input device.

In some embodiments, a memory of the sensor device may store a reduced-size version of the computational application 140, e.g., with less functionality than the full-size computational application 140. In some embodiments, however, the computational application 140 is omitted and the memory of the sensor device stores the cloud storage front end 144 as a standalone application and/or module. In some embodiments, the cloud storage front end 144 is incorporated into another suitable application different than the computational application 140. In some embodiments, the cloud storage front end 144 is a web browser, and the sensor device 198 can cause the cloud server system to modify cloud storage objects via the web browser. In some embodiments, the cloud storage front end 144 is a communication application (e.g., an email application, a text messaging application, etc.), and the sensor device 198 can cause the cloud server system to modify cloud storage objects via the communication application, as will be discussed in more detail below.

In various embodiments, a user can utilize the cloud storage front end 144 to cause the cloud storage management module 190 to create cloud storage objects 184 and/or to cause the cloud storage management module 190 to modify cloud storage objects 184. For example, in some embodiments, the computational application 140 implements a notebook, a spreadsheet, program, etc., that creates, in cooperation with the cloud storage management module 190, cloud objects 184. As another example, in some embodiments, the computational application 140 implements a document, a notebook, a spreadsheet, a program, etc., that modifies, in cooperation with the cloud storage management module 190, cloud storage objects 184. As another example, in some embodiments, the computational application 140 implements a document, a notebook, a spreadsheet, a program, etc., that retrieves, in cooperation with the cloud storage management module 190, data from cloud storage objects 184.

In embodiments that include a sensor device 198, a cloud storage front end module 144 implemented in sensor device 198 modifies, in cooperation with the cloud storage management module 190, cloud storage objects 184. For example, the cloud storage front end module 144 implemented in sensor device 198 adds, in cooperation with the cloud storage management module 190, sensor data (e.g., measured real world physical parameters) to already created cloud storage objects 184, according to an embodiment. Then, a user can process the sensor data using the computation application 140 implemented on the computer 102, in an embodiment. For example, the cloud storage front end module 144 implemented on the computer 102 retrieves sensor data from the cloud storage objects 184 and the computation application 140 implemented on the computer 102 processes the sensor data, according to an embodiment. In some embodiments that include a sensor device 198, the cloud storage front end module 144 implemented in sensor device 198 may be configured to create, in cooperation with the cloud storage management module 190, cloud storage objects 184. In some embodiments that include a sensor device 198, the cloud storage front end module 144 implemented in sensor device 198 may be configured to retrieve, in cooperation with the cloud storage management module 190, data from cloud storage objects 184.

Creating Cloud Storage Objects

In some embodiments, the computational application 140 provides a built-in function for creating cloud storage objects 184. A cloud storage object 184 may be referred to as a "databin", and the computational application 140 may provide a built-in function with a descriptive keyword such as "CreateDatabin", where the built-in function is for creating cloud storage objects 184 (e.g., databins). Thus, in some embodiments, a user can utilize the computational application 140 and the CreateDatabin function to create cloud storage objects 184 ("databins"). For example, in an embodiment, in response to a user entering the built-in function CreateDatabin into a workspace such as a notebook and causing the computational application 140 to evaluate the built-in function (e.g., by pressing "Enter" or taking some other suitable action), the computational application 140 interacts with the cloud storage management module 190, causing the cloud storage management module 190 to create a databin. For example, the computational application 140 may evaluate the CreateDatabin function entered within the workspace, and, responsive to the evaluation, use an application programming interface (API) to cause the cloud storage management module 190 to create a databin. (Merely for ease of explanation and brevity, examples are discussed below in the context of databins and built-in functions of the computational application 140 to create, modify, and access databins. In other embodiments, however, cloud storage objects 184 need not be databins or referred to as "databins", and other suitable built-in functions of the computational application 140 may be utilized to create, modify, and access cloud storage objects 184.)

Responsive to receiving information from the cloud storage front end 144 indicating that the user seeks to create a databin (e.g., via an API), the cloud storage management module 190 creates a databin and assigns the created databin with a unique identifier (ID) to facilitate access to the created databin. In an embodiment, the cloud storage management module 190 randomly or pseudo-randomly generates the unique ID and associates the unique ID with the created databin. In an embodiment, the cloud storage management module 190 associates a location of the created databin in the cloud storage 180 with the unique ID so that the databin can be accessed using the unique ID.

In some embodiments, the CreateDatabin function includes one or more arguments that a user can utilize to control characteristics of the databin. For example, an argument or arguments may be utilized to control access permissions for the databin, in an embodiment. For instance, an argument of the CreateDatabin function may be utilized to control whether the databin is publicly accessible via a public network such as the Internet. For example, the argument may provide options such as (i) the databin is publicly accessible via the Internet; (ii) the databin is not accessible via a public network such as the Internet, but is accessible via a private network or system (e.g., a network or system that requires authentication (e.g., a login), a specific LAN, a specific WLAN, etc.); (iii) the databin is publicly accessible via the Internet, but can be accessed only by specific users; etc. In an embodiment, private access corresponds to access by an authorized user logged into the system 100, i.e., someone who is not logged in cannot access a databin configured for private access. In some embodiments, access permissions for a type of access may include options such as read only access, write only access, or read/write access, where the type of access may be, for example, (i) public access via the Internet; (ii) access via a private network or system; etc. As an illustrative example, public access via the Internet may be limited to read-only access, whereas read/write access may be allowed via a private network or system.

As another example, an argument or arguments may be utilized to control access permissions for specific users or machines, in an embodiment. For instance, the specific users may be identified using unique user IDs. In some embodiments, access permissions for a specific user may include options such as read only access, write only access, or read/write access. As another example, specific machines may be identified using unique IDs such as a universally unique ID (UUID) such as or including a media access control (MAC) address assigned to a machine by a manufacturer or supplier. In some embodiments, access permissions for a specific user may include options such as read only access, write only access, or read/write access.

In some embodiments, an argument or arguments of the CreateDatabin function may be utilized to indicate how data added to a databin should be interpreted by the computational application 140 and/or how raw data added to the data bin should be converted to data type formats recognized by the computational application 140. For example, in an embodiment, the computational application 140 is configured to process various different types of data, and argument or arguments of the CreateDatabin function are utilized to indicate to the computational application 140 the type or types of data in the databin. As another example, in an embodiment, argument or arguments of the CreateDatabin function are utilized to indicate to the cloud storage management module 190 how raw data added to the data bin should be converted to data type formats recognized by the computational application 140.

In some embodiments, the cloud storage management module 190 may be configured to automatically determine how raw data in the data bin should be converted to data type formats recognized by the computational application using techniques such as described in U.S. patent application Ser. No. 13/763,568, filed Feb. 8, 2013 and/or U.S. patent application Ser. No. 14/216,461, filed Mar. 17, 2014, both of which are hereby incorporated by reference herein in their entireties.

In some embodiments, with the computational application 140, any type of data is internally represented as a symbolic expression, with all more specific data types treated as special cases—symbols to which additional rules apply. In some embodiments, evaluation of a symbolic expression by the computational application 140 involves applying to the symbolic expression all transformation rules that fit that type of expression. For example, the computational application 140 will apply different transformation rules to numeric data versus text versus image data, etc. Thus, in an embodiment, an argument or arguments of the CreateDatabin function are utilized to indicate to the cloud storage management module 190 how raw data added to the data bin should be converted to a symbolic format recognized by the computational application 140.

In some embodiments, an argument or arguments of the CreateDatabin function may be utilized to indicate a function that should be invoked, e.g., by the computational application 140, when data is added to a databin. For example, in an illustrative embodiment, the argument or arguments may specify that the computational application 140 is to invoke a particular function that processes data added to a databin, and then store a result of the invoked function in the databin.

In some embodiments, a set of arguments/options, such as described above, may be defined by the user for a class of databins. In such embodiments, an argument of the CreateDatabin function may be utilized to indicate the class of databin to be created, and then all arguments/options defined for that class will be applied to the created databin by the cloud storage management module 190. For example, in an embodiment, a user may define one or more of (i) access permissions for the class, (ii) how data added to databins of the class should be interpreted by the computational application 140 and/or how raw data added to databins of the class should be converted to data type formats recognized by the computational application 140, (iii) what function or functions should be invoked when data is added databins of the class, etc. When a user creates a databin specifying the particular class, the cloud storage management module 190 applies the specified arguments/options of the class to the created databin, and/or creates the databin according to the specified arguments/options of the class.

In an illustrative embodiment, the CreateDatabin has a format as follows:

CreateDatabin[ ]; and/or

CreateDatabin[options], where options is an argument or arguments. The argument(s) options may include:

"Name"—indicates a name to assign to the databin to be created;

"Class"—indicates the class of the databin to be created;

"Interpretation"—indicates how data entries to the databin are to be interpreted;

"NewEntryFunction"—indicates a function to be applied when a new entry is added to the databin; and/or "Permissions"—indicates access permissions for the databin.

In an embodiment, after the cloud storage management module 190 creates the databin, the cloud storage management module 190 returns an ID for the databin (e.g., a UUID, a shortened version of the UUID, etc.) to the cloud storage front end 144 (e.g., via an API). Thus, in an embodiment, responsive to evaluation of the CreateDatabin function in a workspace (e.g., a notebook), the computational application 140 displays and/or makes available the returned ID in the workspace. In an embodiment in which the computational application 140 is configured to internally represent different types of data as symbolic expressions, databins themselves are represented as symbolic expressions. Thus, in an embodiment, responsive to evaluation of the CreateDatabin function in a workspace (e.g., a notebook), the computational application 140 returns a handle to the symbolic databin object, which may include the ID of the databin.

Figure 2A:
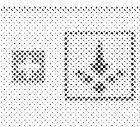
FIG. 2A is an example of programmer input utilized to create a cloud storage object, according to an embodiment.

FIG. 2A is an example in which a programmer utilizes the CreateDatabin function to create a databin in the cloud storage 180 (FIG. 1), according to an embodiment. The programmer has entered into a notebook an expression bin=CreateDatabin[]. The computational application 140 evaluates the entered expression and, in response, utilizes an API to cause the cloud storage management module 190 to create a databin. Next, the cloud storage management module 190 creates the databin and returns a handle to the created symbolic databin object. The databin object indicates a corresponding short ID for the databin. The computational application 140 sets the variable "bin" equal to the handle to the created symbolic databin object.

Figure 2B:
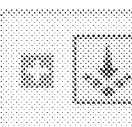
FIG. 2B is another example of programmer input utilized to create a cloud storage object, according to another embodiment.

FIG. 2B is another example in which a programmer utilizes the CreateDatabin function to create a databin in the cloud storage 180 (FIG. 1), according to an embodiment. The programmer has entered into a notebook an expression bin=CreateDatabin["Interpretation"->{"city"->"City", "temp"->Restricted["StructuredQuantity", "DegreesCelsius"]}]. The computational application 140 evaluates the entered expression and, in response, utilizes an API to cause the cloud storage management module 190 to create a databin.

In the example of FIG. 2B, the programmer uses parameters to specify how raw data added to the databin should be converted to data type formats recognized by the computational application 140. For example, entries associated with a key "city" should be converted to City symbolic objects, which are stored in a format recognized by the computational application 140 as city entities. Also, entries associated with a key "temp" should be converted to symbolic objects that are stored in a format recognized by the computational application 140 as temperature values with units of Celsius.

Also in the example of FIG. 2B, the programmer uses parameters to specify a function to be applied when raw data is added to the databin. For example, for entries associated with the key "temp", the function "Restricted" is to be applied, where Restricted is a built-in function of the computational application 140. The Restricted function as set forth in FIG. 2B will convert raw data entries to symbolically represented temperature values with units of Celsius. Additionally, the Restricted function as set forth in FIG. 2B will generate an error message when the raw data value does not corresponds to a temperature value with units of Celsius. For example, if the entry is "temp"->xxxx, an error message will be generated because the raw data entry xxxx cannot be converted to a temperature value with units of Celsius.

The cloud storage management module 190 creates the databin and returns a handle to the created symbolic databin object. The computational application 140 sets the variable "bin" equal to the handle to the created symbolic databin object.

In the example of FIG. 2B, the value of the Interpretation parameter specifies a data signature for the created databin, where the data signature specifies how entries in the databin are to be interpreted by the computational application 140, according to an embodiment. For instance, in the example of FIG. 2B, the data signature specifies that entries associated with the key "city" are to be interpreted as City entities, and entries associated with the key "temp" are to be interpreted as temperature values with units of degrees Celsius. Specifying how entries in the databin are to be interpreted by the computational application 140 may be referred to as specifying data semantics.

Figure 2C:
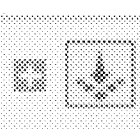
FIG. 2C is another example of programmer input utilized to create a cloud storage object, according to another embodiment.

FIG. 2C is another example in which a programmer utilizes the CreateDatabin function to create a databin in the cloud storage 180 (FIG. 1), according to an embodiment. In the example of FIG. 2C, the parameter "Name" is utilized to assign a name (e.g., "My new data bin") to the created databin. The cloud storage management module 190 creates the databin and returns a handle to the created symbolic databin object. The computational application 140 sets the variable "bin" equal to the handle to the created symbolic databin object.

Figure 2D:
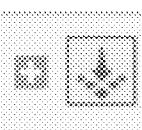
FIG. 2D is yet another example of programmer input utilized to create a cloud storage object, according to yet another embodiment.

FIG. 2D is another example in which a programmer utilizes the CreateDatabin function to create a databin in the cloud storage 180 (FIG. 1), according to an embodiment. In the example of FIG. 2D, the parameter "Permissions" is utilized to make the created databin accessible only to those logged into the cloud-based development system 188 by setting the Permissions parameter to a value "Private". The cloud storage management module 190 creates the databin and returns a handle to the created symbolic databin object. The computational application 140 sets the variable "bin" equal to the handle to the created symbolic databin object.

In some embodiments, databins can be created additionally or alternatively using other suitable techniques. For example, in some embodiments, a databin can be created using a graphical user interface (GUI) implemented by the computer 102 (FIG. 1), where the GUI utilizes one or more suitable GUI mechanisms, such as one or more of i) one or more buttons, ii) one or more hypertext links, iii) one or more pull-down menus, iv) one or more pop-up menus, v) one or more text boxes, etc. Referring again to FIG. 1, in an embodiment, in response to a selecting to create a databin with the GUI, the computer 102 interacts with the cloud storage management module 190, causing the cloud storage management module 190 to create a databin. For instance, the GUI may be implemented using a web browser application executed by the computer 102, in an embodiment. As another example, the GUI may be implemented using a mobile application (mobile app) executed by the computer 102, in an embodiment. In embodiments in which the GUI is implemented using a web browser application, the server 152 (or another server communicatively coupled to the server 152) may implement a web server module (not shown in FIG. 1) that serves web pages to the web browser application on the computer 102, and the web pages may provide one or more GUI mechanisms such as described above.

Responsive to receiving information from the computer 102 indicating that the user seeks to create a databin (e.g., via an API), the cloud storage management module 190 creates a databin and assigns the created databin with an ID to facilitate access to the created databin and associates a location of the created databin in the cloud storage 180 with the unique ID so that the databin can be accessed using the unique ID as discussed above, according to an embodiment.

In some embodiments, the user can utilize one or more GUI mechanisms to control characteristics of the databin, such as access permissions, how data added to a databin should be interpreted by the computational application 140 and/or how raw data added to the data bin should be converted to data type formats recognized by the computational application 140, to indicate a function that should be invoked, e.g., by the computational application 140, when data is added to a databin, etc. In an illustrative embodiment, the user can utilize one or more GUI mechanisms to control characteristics of the databin, such as one of, or any suitable combination of two or more of: a name to assign to the databin, a class of the databin, how data entries to the databin are to be interpreted, a function to be applied when a new entry is added to the databin, access permissions for the databin, etc.

In an embodiment, after the cloud storage management module 190 creates the databin, the cloud storage management module 190 returns an ID for the databin (e.g., a UUID, a shortened version of the UUID, etc.) to the computer 102 (e.g., via an API), and the ID is displayed on a display device of the computer 102 by the web browser, the mobile app, etc.

The created databin may comprise one or more files. For example, in one embodiment, the databin includes one or more metadata files and one or more data files for storing data subsequently added to the databin. In some embodiments, the databin may be organized as a file system (e.g., a directory), and creation of the databin may include creating the file system (e.g., the directory). In some embodiments, a file or files of the databin may be a text file(s) written in a suitable markup language such as the Extensible Markup Language (XML), an XML-based language, a proprietary markup language, etc. Thus, creation of the databin may include creating one or more files written in a suitable markup language, according to some embodiments.

Figure 3:
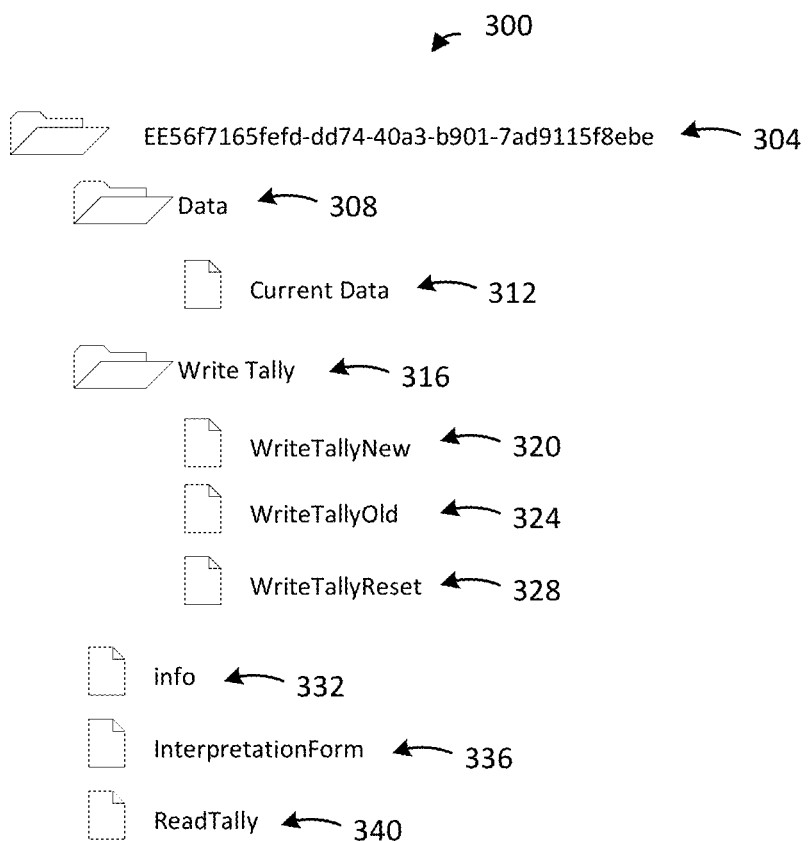
FIG. 3 is an example of an electronic file system structure of a cloud storage object, according to an embodiment.

FIG. 3 is an illustrative example of a directory 300 created for a databin, according to an illustrative embodiment. Thus, in some embodiments, creating a databin comprises creating a suitable directory such as the directory 300. In some embodiments, however, some of the folders, files, etc., illustrated in FIG. 3 are not created upon initial creation of a databin, but rather are subsequently created when the databin is modified by adding data to the databin, when data is read from the databin, etc., for example. The directory 300 is stored in the cloud storage 180 (FIG. 1), in an embodiment.

The directory 300 includes a top level folder 304. In some embodiments, the top level folder 304 may be named or otherwise associated with an ID (e.g., a UUID) associated with the databin to facilitate access to the top level folder 304 using the ID. The top level folder 304 includes a subfolder 308, which in turn includes a file 312 for storing data added to the databin. The top level folder 304 also includes a subfolder 316, which in turn includes a plurality of files 320, 324, 328 that are utilized for storing information that indicates, and/or facilitates calculating, usage information associated with the databin, such as one or more of i) a volume of data stored in the databin, a rate of adding data to the databin, etc.

The top level folder 304 also includes a file 332 for storing metadata regarding the databin, and a file 336 for storing information indicating how data in the subfolder 308 are to be interpreted by the computational application 140 and/or how raw data in the subfolder 308 are to be converted to data type formats recognized by the computational application 140 (e.g., semantic information). The top level folder 304 further includes a file 340 for storing information that indicates, and/or facilitates calculating, usage information associated with the databin, such as a rate of acquiring data from the databin, etc.

In an embodiment, responsive to receiving information from the computer 102 indicating that the user seeks to create a databin (e.g., via an API), the cloud storage management module 190 creates a directory, such as the directory 300, or at least some of the directory. For example, in an embodiment, responsive to receiving information from the computer 102 indicating that the user seeks to create a databin (e.g., via an API), the cloud storage management module 190 creates at least some of the folders and/or at least some of the files illustrated in FIG. 3.

As an illustrative example, the file 332 includes the following metadata information set forth using a markup language, according to an illustrative embodiment:

```
<|"Bin" -> <|"UUID" -> "EE56f7165fefd-dd74-40a3-b901-
7ad9115f8ebe",
    "Name" -> "Unnamed"|>,
"ReadAuthorization" -> <|"Type" -> "Public"|>,
"WriteAuthorization" -> <|"Type" -> "Public"|>,
"Owner" -> "johnsmith@wolfram.com",
"OwnerUUID" -> "56ee39ac-323d-481b-a9e4-6df0dd549816",
"Administrators" -> {"johnsmith@wolfram.com"},
"Interpretation" -> {"n" -> "Number", "x" -> "Country"},
"DataFormatVersion" -> 2,
"CreationDate" -> DateObject[{2015, 5, 28}, TimeObject[{18, 54,
49.96018}, TimeZone -> 0.],
"Creator" -> "johnsmith @wolfram.com"|>
```

In this embodiment, the metadata file 332 includes: a markup "bin" associated with content corresponding to a UID (e.g., UUID EE56f7165fefd-dd74-40a3-b901-7ad9115f8ebe) assigned to the databin; a markup "Name" associated with content indicating a name assigned to the databin or that the databin is unnamed (e.g., "Unnamed"); a markup "ReadAuthorization" associated with content that specifies read access rights for the databin (e.g., "Public", "Private", etc.); a markup "WriteAuthorization" associated with content that specifies write access rights for the databin (e.g., "Public", "Private", etc.); a markup "Owner" associated with content that specifies an ID corresponding to a user account associated with the databin (e.g., a username such as an email address); a markup "OwnerUUID" associated with content that specifies a unique ID associated with the user account (e.g., a UUID); a markup "Administrators" associated with content that specifies one or more users that have administrative privileges with regard to the databin (e.g., one or more usernames such as an email addresses); a markup "Interpretation" associated with content that specifies how the computational application 140 is to interpret data stored to the databin (e.g., including an association between a key (e.g., "x") and specification data regarding how to interpret data corresponding to the key (e.g., "Country"); a markup "DataFormatVersion" associated with content that specifies version information regarding a data format associate with the databin; a markup "CreationDate" associated with content that specifies when the databin was created; and a markup "Creator" associated with content that specifies an ID corresponding to a user that created the databin (e.g., a username such as an email address).

In other embodiments, the metadata file 332 omits some of the information discussed above and/or includes additional suitable information. For example, in some embodiments, when the databin is associated with the sensor device 198, the metadata file 332 (or another file in the directory 300) includes identifying data corresponding to the sensor device 198, such as one or more of a serial number, a UUID, a unique user ID corresponding to the sensor device 198, etc., assigned to the sensor device 198 by a manufacturer, distributor, etc., of the sensor device 198.

In some embodiments, another suitable markup language is utilized such as XML, an XML-based language, etc.

In an embodiment, responsive to receiving information from the computer 102 indicating that the user seeks to create a databin (e.g., via an API), the cloud storage management module 190 creates the file 332.

As another illustrative example, the file 336 includes the information, set forth using a markup language, that indicates how raw data in the file 312 are to be converted to data type formats recognized by the computational application 140, according to an illustrative embodiment:

FormObject[<|"n"-><|"Interpreter"->"Number"|>,
"x"-><|"Interpreter"->"Country"|>|>]

In this embodiment, the file 336 includes a structured statement including keywords corresponding to built-in functions of the computational application 140 (e.g., "FormObject", "Interpreter"), and keywords corresponding to parameters of the built-in functions (e.g., "Number", "Country"). The structured statement, when evaluated by the cloud storage management module 190, instructs the cloud storage management module 190 how to convert raw data in the file 312 to data type formats recognized by the computational application 140. In the illustrative example above, the structured statement, when evaluated by the cloud storage management module 190, instructs the cloud storage management module 190 to convert raw data associated with the key "n" to a data type "Number", and to convert data associated with the key "x" to a data type "Country".

In an embodiment, responsive to receiving information from the computer 102 indicating that the user seeks to create a databin (e.g., via an API), the cloud storage management module 190 creates the file 336.

In an embodiment, responsive to receiving information from the computer 102 indicating that the user seeks to create a databin (e.g., via an API), the cloud storage management module 190 creates the file 312 as an empty file.

Figure 4:
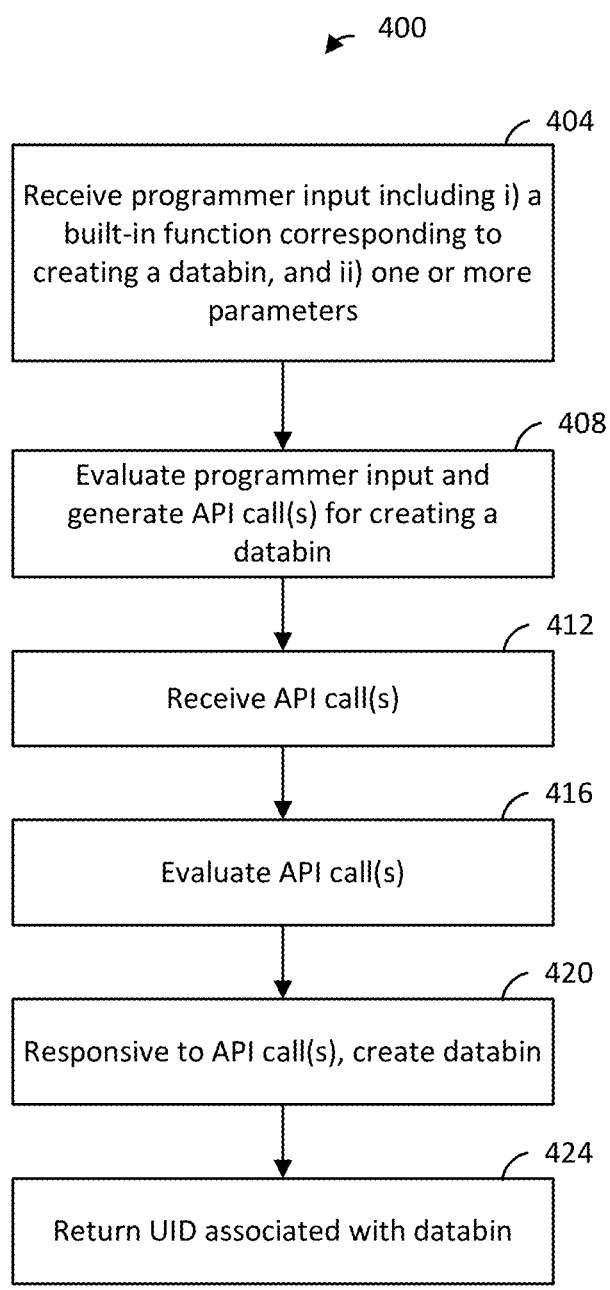
FIG. 4 is a flow diagram of an example method for creating a cloud storage object, according to an embodiment.

FIG. 4 is a flow diagram of an example method 400 for creating a databin, according to an embodiment. The method 400 may be implemented in the system 100 of FIG. 1, in an embodiment, and the method 400 is described with reference to the system 100 of FIG. 1 for explanatory purposes. In other embodiments, however, the method 400 is implemented in another suitable system. Similarly, in some embodiments, another suitable method different than the method 400 is implemented in the system 100.

At block 404, programmer input corresponding to a built-in function of the computational application 140 is received, where the built-in function is for creating databins. In an embodiment, the programmer input may include i) a keyword (e.g., CreateDatabin) corresponding to the built-in function, and ii) optionally, one or more parameters of the built-in function such as described above. The programmer input may be received via one or more user input devices of the computer 102, and input into a document such as a notebook, a spreadsheet, etc.

At block 408, the programmer input is evaluated by the computational application 140, and, responsive to the evaluation, one or more API calls may be generated by the cloud storage front end module 144, where the one or more API calls correspond to requests for a databin to be created, and the one or more API calls optionally may include indication(s) of one or more parameters such as described above.

The one or more API calls may be transmitted from the computer 102 to the server 152 via the network 150. At block 412, the API call(s) are received by the server 152.

At block 416, the one or more API calls are evaluated by the cloud storage management module 190, and, responsive to the evaluation, a databin is created at block 420. Creating the databin may include creating a file system (e.g., a directory) having one or files, such as described above. For example, creating the databin may include creating one or more files written in a suitable markup language such as described above, according to some embodiments.

Creating the databin may include generating an ID (e.g., a UUID) and associating the ID with the databin. The ID may be utilized subsequently to access the created databin. At block 424, the cloud storage management module 190 may return the ID to the cloud storage front end module 144 according to an API. For example, the ID may be transmitted by the server 152 to the computer 102 via the network 150, in an embodiment.

In various other embodiments, one or more blocks of the method 400 may be omitted, blocks may be rearranged, one or more additional blocks may be added, etc.

Referring again to FIG. 1, in some embodiments, the cloud storage management module 190 may be implemented as a multi-threaded server module to handle high volume and/or high rate accesses to cloud storage objects 184. For example, different threads may handle different requests to create databins, in an embodiment.

Adding Data to Cloud Storage Objects

Referring again to FIG. 1, in some embodiments, the system 100 provides a plurality of mechanisms for adding data to databins using techniques such as described above (or using other suitable techniques). In such embodiments, the plurality of available mechanisms for adding data to databins may provide much flexibility for users to gather data for subsequent analysis by the computational application 140 (and/or a separate data analysis application). For example, in an illustrative embodiment, data can be added to a databin i) programmatically via a function in a notebook being evaluated by the computational application 140, ii) via a universal resource locator (URL), iii) via one or more web pages served by a web server module implemented by the server 152 (or another server coupled to the server 152), iv) via email, v) directly by the sensor device 198, etc.

In other embodiments, the system only provides one of, or a subset of, the mechanisms for adding data to databins discussed above, and/or provides one or more other suitable mechanisms.

Adding Data Programmatically

In some embodiments, the computational application 140 provides a built-in function for adding data to databins. For example, the computational application 140 may provide a built-in function with a descriptive keyword such as "DatabinAdd", where the built-in function is for adding data to cloud storage objects 184 (e.g., databins). Thus, in some embodiments, a user can utilize the computational application 140 and the DatabinAdd function to add data to cloud storage objects 184 ("databins"). For example, in an embodiment, in response to a user entering the built-in function DatabinAdd into a workspace such as a notebook and causing the computational application 140 to evaluate the built-in function (e.g., by pressing "Enter" or taking some other suitable action), the computational application 140 interacts with the cloud storage management module 190, causing the cloud storage management module 190 to add data to a specified databin. For example, the computational application 140 may evaluate the DatabinAdd function entered within the workspace, where parameters of the DatabinAdd function specify i) a particular databin and ii) data to be added to the specified databin, and, responsive to the evaluation, use an API to cause the cloud storage management module 190 to add the specified data to the specified databin. In some embodiments, evaluation of the DatabinAdd function involves creating a connection (e.g., a transmission control protocol (TCP) connection, a stream control transmission protocol (SCTP) connection, etc.) between a socket corresponding to the cloud storage front end 144 and a socket corresponding to the specified databin. Thus, in such embodiments, when the connection has already been established, evaluation of the DatabinAdd function may involve sending the data to the already established connection. For example, in an embodiment, when the connection has already been established, evaluation of the DatabinAdd function may involve sending the data to the socket corresponding to the cloud storage front end 144.

Responsive to receiving information from the cloud storage front end 144 indicating that the user seeks to add specified data to a specified databin (e.g., via an API, via an established connection), the cloud storage management module 190 stores the specified data in the databin. In some embodiments, the cloud storage front end 144 first locates the specified data bin in the cloud storage 180.

In some embodiments, the DatabinAdd function includes arguments that a user can utilize to specify i) a databin, and ii) data to be added to the databin. In an illustrative embodiment, the DatabinAdd function has a format as follows:

DatabinAdd[bin, data], where bin is an argument specifying a unique ID associated with a databin, and data is an argument or arguments specifying data to be added to the databin.

Figure 5A:
FIG. 5A is an example of programmer input utilized to add data to a cloud storage object, according to an embodiment.

FIG. 5A is an example in which a programmer utilizes the DatabinAdd function to add data to a databin in the cloud storage 180 (FIG. 1), according to an embodiment. The example of FIG. 5A corresponds to adding data to a databin created as described in the example of FIG. 2A. The programmer has entered into a notebook an expression DatabinAdd[bin, 1234], where the variable "bin" is set to the handle to the symbolic databin object created in the example of FIG. 2A. The computational application 140 evaluates the entered expression and, in response, utilizes an API, a connection, etc., to cause the cloud storage management module 190 to add the data "1234" to the databin corresponding to value of the variable "bin". Next, the cloud storage management module 190 adds the data to the specified databin and returns a handle to the specified databin.

Figure 5B:
FIG. 5B is another example of programmer input utilized to add data to a cloud storage object, according to another embodiment.

FIG. 5B is another example in which a programmer utilizes the DatabinAdd function to add data to a databin in the cloud storage 180 (FIG. 1), according to an embodiment. The example of FIG. 5B corresponds to adding data to a databin created as described in the example of FIG. 2B. The programmer has entered into a notebook an expression Databin[bin, <|"city"->"nyc", "temp"->20.4|>], where the variable "bin" is set to the handle to the symbolic databin object created in the example of FIG. 2B. The computational application 140 evaluates the entered expression and, in response, utilizes an API, a connection, etc., to cause the cloud storage management module 190 to add the data "nyc", associated with the key "city", and the data 20.4, associated with the key "temp", to the databin corresponding to value of the variable "bin". Next, the cloud storage management module 190 adds the data to the specified databin and returns a handle to the specified databin.

As discussed above in connection with the example of FIG. 2B, it was specified that entries associated with a key "city" should be converted to City symbolic objects, which are stored in a format recognized by the computational application 140 as city entities, and entries associated with a key "temp" should be converted to symbolic objects that are stored in a format recognized by the computational application 140 as temperature values with units of Celsius. Thus, the cloud storage management module 190 recognizes that the data "nyc" in FIG. 5 is associated with the key "city", and the data 20.4 is associated with the key "temp". Thus, the cloud storage management module 190 will determine that the raw data "nyc" corresponds to New York City, and will convert the raw data "nyc" to a symbolic object corresponding to the entity New York City. Similarly, the cloud storage management module 190 will convert the raw data "20.4" to a symbolic object corresponding to a temperature of 20.4 degrees in units of Celsius.

In an embodiment, data is stored to the databin as raw data, and the raw data is also converted to appropriate data types recognized by the computational application 140 and then stored to the databin. In another embodiment, when the converted data has been stored to the databin, the raw data is deleted from the databin. In other embodiments, the raw data is not stored to the databin, but rather the raw data is first converted to appropriate data types recognized by the computational application 140 and then the converted data is stored to the databin instead of the raw data.

In some embodiments, when data is stored to the databin, metadata regarding the data entry is also stored to the databin. For example, in an embodiment, a timestamp is stored to the databin, where the timestamp indicates when the data was stored to the databin. As another example, in an embodiment, a UUID for the data entry is generated, and the UUID is stored to the databin, where the UUID is associated with the data entry. As another example, in an embodiment, a user ID is stored to the databin, where the user ID indicates a user requested the data to be stored to the databin. As another example, in an embodiment, location data (e.g., city/state, geoposition data (e.g., latitude/longitude, GPS coordinates, etc.)) is stored to the databin, where the location data indicates where the request to store the data originated. For example, the location data may indicate a location of the user computer 102.

In an embodiment, responsive to receiving information from the computer 102 indicating that specified data is to be added to a specified databin (e.g., via an API, a connection, etc.), the cloud storage management module 190 locates a directory corresponding to the databin, such as the directory 300, using the ID provided via the API, information regarding the connection, etc. For example, in an embodiment, responsive to receiving information from the computer 102 indicating that specified data is to be added to a specified databin (e.g., via an API, a connection), the cloud storage management module 190 accesses one or more files in the directory, such one or more of the files illustrated in FIG. 3.

As an illustrative example, the cloud storage management module 190 may locate the folder 308 and the file 312 within the folder 308, and then modify the file 312 to add the specified data to the file 312. According to an illustrative embodiment that corresponds to the example of FIG. 5B, the following text is added to the file 312:

<drop>
Timestamp -><::>
  <TIMESTAMP><:>{2015, 5, 28, 18, 55, 4.26938}<:>
  <::>
<:>
UUID<>"data29cc186c-48ba-4303-91ac-
  6f5058795bfa"<:>
<:>
Size<:>432<:>
<:>
InterpretedQ<:>False<:>
<:>
SourceInformation<:><|"TimeRecorded"->{2015, 5, 28, 18, 55, 4.26938'8.38293978954441}, "TimeGiven"->Missing[],
  "Authenticated"->True, "WolframID"->
  "johnsmith@wolfram.com", "GeoLocation"->
  GeoPosition[{40.11, -88.24}], "SourceType"->Missing
  [],
  "SourceDetails"-><|"RequesterAddress"->None,
  "Requester"->
  "johnsmith@wolfram.com",       "UserAgent"->
  None|>|><:>
<:>
RawData<:><|"city"->"nyc", "x"->"temp"->20.4|><:>

In this embodiment, the file 312 is generated to include metadata such as: timestamp data corresponding to the entry; a UUID corresponding to the entry; size data corresponding to a size of the entry and/or a size of the databin; other metadata corresponding to one or more of i) a user that requested entry of the data in the databin, ii) location information corresponding to the request to add data to the entry, etc. The different metadata may be indicated and demarcated within the file 312 with markups.

In an embodiment, the raw data is added. Additionally, in an embodiment, the metadata includes data that indicates whether the raw data has been converted to appropriate data types recognized by the computational application 140. For example, a markup (e.g., InterpretedQ) and associated data (e.g., "False") indicates whether the raw data has been converted to appropriate data types recognized by the computational application 140. In the illustrative example, the associated data "False" indicates that the raw data has not yet been converted to appropriate data types recognized by the computational application 140.

In other embodiments, the file 312 omits some of the information discussed above and/or includes additional suitable information. In some embodiments, another suitable markup language is utilized such as XML, an XML-based language, etc.

In an embodiment, if the file 312 has not yet been created, responsive to receiving information from the computer 102 indicating that the user seeks to add data to the databin associated with the directory 300 (e.g., via an API), the cloud storage management module 190 creates the file 312.

In an embodiment, the cloud storage management module 190 includes a raw data conversion module that analyzes databins to determine whether each databin includes raw data that has not yet been converted to appropriate data types recognized by the computational application 140. For example, in an embodiment, the raw data conversion module analyzes metadata associated with a databin (e.g., in the file 312 or in another suitable location) to determine whether raw data in the databin has been converted to appropriate data types recognized by the computational application 140. For example, in an embodiment, the raw data conversion module analyzes data associated with the markup InterpretedQ to determine whether the data corresponds to "False" (which indicates that the raw data has not been converted to appropriate data types recognized by the computational application 140) or to "True" (which indicates that the raw data has been converted to appropriate data types recognized by the computational application 140). The raw data conversion module may execute as a background process and/or in response to a read access to a databin, in some embodiments.

In an embodiment, when raw data is added to a databin, an indication of the databin (e.g., the ID of the databin) and, optionally, an indication of the raw data in the databin (e.g., the ID of the entry), is stored in a queue associated with the raw data conversion module. In an embodiment, the raw data conversion module examines the queue to determine databins that include raw data that has not been converted to appropriate data types recognized by the computational application 140.

Responsive to determining that a databin includes raw data that has not yet been converted to appropriate data types recognized by the computational application 140, the raw data conversion module may utilize information in the metadata file 332 and/or the file 336 that specifies how the raw data is to be converted and/or processed. For example, in an embodiment, the raw data conversion module may utilize information in the file 336 to process the raw data. When the raw data has been converted, the raw data conversion module may store the converted data in the databin, e.g., in the file 312. Continuing with the illustrative above, the file 312 may be modified so that markup data indicating the converted data in a format recognized by the computational application 140:

Data -> <::>
  <VALUE><:>city<:>Entity["City", "New York City"]<:>
  <::>
  <VALUE><:>x<:> Quantity[20.4, "Celsius"]<:>
  <::> is included in the file 312:

```
<drop>
Data -> <::>
   <VALUE><:>city<:>Entity["City", "New York City"]<:>
   <::>
   <VALUE><:>x<:>Quantity[20.4, "Celsius"]<:>
   <::>
<:>Timestamp -> <::>
   <TIMESTAMP><:>{2015, 5, 28, 18, 55, 4.26938}<:>
   <:>
<:>
UUID<:>"data29cc186c-48ba-4303-91ac-6f5058795bfa"<:>
<:>
Size<:>432<:>
<:>
InterpretedQ<:>False<:>
<:>
SourceInformation<:><|"TimeRecorded" -> {2015, 5, 28, 18, 55,
4.26938`8.38293978954441}, "TimeGiven" -> Missing[],
"Authenticated" -> True, "WolframID" ->
"johnsmith@wolfram.com", "GeoLocation" ->
GeoPosition[{40.11, -88.24}], "SourceType" -> Missing[],
"SourceDetails" -> <|"RequesterAddress" -> None, "Requester" ->
"johnsmith@wolfram.com", "UserAgent" -> None|>|><:>
<:>
RawData<:><|"city" -> "nyc", "x" -> "temp" ->20.4|><:>
```

As another illustrative example, the file 336 includes the information, set forth using a markup language, that indicates how raw data in the file 312 are to be converted to data type formats recognized by the computational application 140, according to an illustrative embodiment:

FormObject[<|"n"-><|"Interpreter"->"Number"|>,
"x"-><|"Interpreter"->"Country"|>|>]

In this embodiment, the file 336 includes a structured statement including keywords corresponding to built-in functions of the computational application 140 and/or the cloud-based development system 188 (e.g., "FormObject", "Interpreter"), and keywords corresponding to parameters of the built-in functions (e.g., "Number", "Country"). The structured statement, when evaluated by the cloud storage management module 190, instructs the cloud storage management module 190 how to convert raw data in the file 312 to data type formats recognized by the computational application 140. In the illustrative example above, the structured statement, when evaluated by the cloud storage management module 190, instructs the cloud storage management module 190 to convert raw data associated with the key "n" to a data type "Number", and to convert data associated with the key "x" to a data type "Country".

In some embodiments, as discussed above, the programmer uses parameters to specify a function to be applied when raw data is added to the databin. In some embodiments, an indication of the function to be applied is included in the structured statement stored in the file 336. The structured statement, when evaluated by the cloud storage management module 190, instructs the cloud storage management module 190 how to apply the specified function.

In an embodiment, the file 336 indicates the data signature discussed above.

In an embodiment, in response to the file 312 reaching a size threshold, a new file for storing data may be created, and subsequently received data may be added to the new file. Similarly, as each additional file reaches the size threshold (or a different threshold), a further file may be created. In some embodiments, a background process monitors the size of files 312 for various databins and creates new files as needed. Data that associates or links the multiple data files may be stored in the file system 300.

Figure 6:
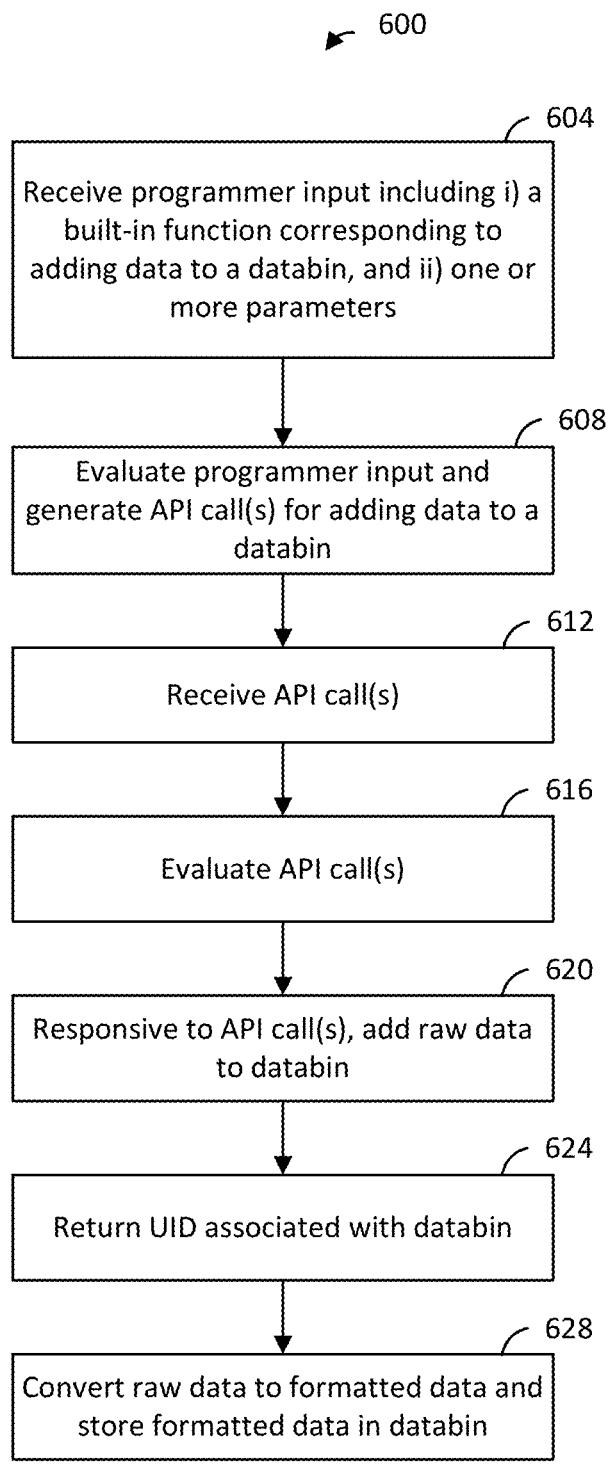
FIG. 6 is a flow diagram of an example method for adding data to a cloud storage object, according to an embodiment.

FIG. 6 is a flow diagram of an example method 600 for adding data to a databin, according to an embodiment. The method 600 may be implemented in the system 100 of FIG. 1, in an embodiment, and the method 600 is described with reference to the system 100 of FIG. 1 for explanatory purposes. In other embodiments, however, the method 600 is implemented in another suitable system. Similarly, in some embodiments, another suitable method for adding data to databins different than the method 600 is implemented in the system 100.

At block 604, programmer input corresponding to a built-in function of the computational application 140 is received, where the built-in function is for adding data to databins. In an embodiment, the programmer input may include i) a keyword (e.g., DatabinAdd) corresponding to the built-in function, and ii) one or more parameters of the built-in function such as described above. For example, a first parameter may indicate the databin and a second parameter may indicate data to be added to the databin. The programmer input may be received via one or more user input devices of the computer 102, and input into a document such as a notebook, a spreadsheet, etc.

At block 608, the programmer input is evaluated by the computational application 140, and, responsive to the evaluation, one or more API calls may be generated by the cloud storage front end module 144, where the one or more API calls correspond to requests for data to be added to the specified databin, and the one or more API calls optionally may include indication(s) of one or more parameters such as described above. In some embodiments, responsive to the evaluation, a connection (e.g., a TCP connection, an SCTP connection, etc.) between a socket corresponding to the cloud storage front end 144 and a socket corresponding to the specified databin is created. In some embodiments, when the connection has already been established, evaluation of the DatabinAdd function may involve sending the data to the already established connection. For example, in an embodiment, when the connection has already been established, evaluation of the DatabinAdd function may involve sending the data to the socket corresponding to the cloud storage front end 144.

The one or more API calls may be transmitted from the computer 102 to the server 152 via the network 150. At block 612, the API call(s) are received by the server 152. In some embodiments, block 612 is modified to include the server 152 establishing a connection (e.g., a TCP connection, an SCTP connection, etc.). In some embodiments, when the connection has already been established, block 612 is modified to include the server 152 receiving data via the connection.

At block 616, the one or more API calls are evaluated by the cloud storage management module 190, and, responsive to the evaluation, the specified raw data is added to the databin at block 620. Adding data to the databin may include adding the raw data to a file such as the file 312 using a suitable markup language such as described above, according to some embodiments. If the file 312 has not yet been created, block 620 may include creating the file 312. In some embodiments, blocks 616 and 620 are modified to include the server 152 receiving data via an established connection.

In some embodiments, in conjunction with adding raw data to the databin, the cloud storage management module 190 may update metadata corresponding to the databin. For example, the cloud storage management module 190 may add timestamp data to the databin and associate the timestamp data with the added raw data, the timestamp corresponding to a time at which the raw data was received by the storage management module 190 or corresponding to a time at which the raw data was stored in the databin by the storage management module 190. As another example, the cloud storage management module 190 may modify metadata that indicates how much data is stored in the databin and/or a size of the databin.

At block 624, the cloud storage management module 190 may return an ID of the databin to the cloud storage front end module 144 according to an API. For example, the ID may be transmitted by the server 152 to the computer 102 via the network 150, in an embodiment. In some embodiments, the ID may be transmitted by the server 152 to the computer 102 via a connection such as described above.

At block 628, the cloud storage management module 190 may convert the raw data to formatted data recognized by the computational application and store the formatted data in the databin. For example, information in the metadata file 332 and/or the file 336 that specifies how the raw data is to be converted and/or processed may be utilized to convert the raw data. For example, in an embodiment, the raw data conversion module may utilize information in the file 336 to process the raw data in the file 312. When the raw data has been converted, the converted data may be stored in the databin, e.g., in the file 312. Block 628 may be performed responsive to determining that a databin includes raw data that has not yet been converted to appropriate data types recognized by the computational application 140, in an embodiment. Similarly, block 628 may be performed responsive to i) an operation attempting to access data in the databin and ii) determining that the databin includes raw data that has not yet been converted to appropriate data types recognized by the computational application 140, in an embodiment. In some embodiments, block 628 may be performed as a background process.

In some embodiments, in conjunction with storing converted data to the databin, the cloud storage management module 190 may update metadata corresponding to the databin. For example, the cloud storage management module 190 may modify metadata that indicates how much data is stored in the databin and/or a size of the databin.

In various other embodiments, one or more blocks of the method 600 may be omitted, blocks may be rearranged, one or more additional blocks may be added, etc. For example, in an embodiment, the raw data is not stored in the databin, and block 620 may be omitted. For example, conversion of raw data and storage of the formatted data at block 628 may replace block 620 and be responsive to evaluation of the API call(s) or receipt of data via a connection (block 616). As another example, in another embodiment, block 624 is omitted or modified to return other information, such as a UID of the data entry.

In some embodiments, when multiple requests to add data to a same databin (and/or when multiple requests to add data to different databins) are received by the server 152 at a high rate, received requests and/or raw data may be initially stored in one or more buffers. In an embodiment, buffered requests are later handled when the server 152 has sufficient processing bandwidth and/or when the cloud storage memory system 180 has sufficient bandwidth. In an embodiment, buffered raw data is stored in databin(s) when the server 152 has sufficient processing bandwidth and/or when the cloud storage memory system 180 has sufficient bandwidth. In some embodiments, handling buffered requests and/or storing buffered raw data to databins may be performed as background processes.

Adding Data via Web Page, App, etc.

In some embodiments, data can be added to a databin using a GUI implemented by the computer 102 (FIG. 1), where the GUI utilizes one or more suitable GUI mechanisms, such as one or more of i) one or more buttons, ii) one or more hypertext links, iii) one or more pull-down menus, iv) one or more pop-up menus, v) one or more text boxes, etc. Referring again to FIG. 1, in an embodiment, in response to a selecting to add data to a databin with the GUI, the computer 102 interacts with the cloud storage management module 190, causing the cloud storage management module 190 to add data to the databin. For instance, the GUI may be implemented using a web browser application executed by the computer 102, in an embodiment. As another example, the GUI may be implemented using a mobile application (mobile app) executed by the computer 102, in an embodiment. In embodiments in which the GUI is implemented using a web browser application, the server 152 (or another server communicatively coupled to the server 152) may implement a web server module (not shown in FIG. 1) that serves web pages to the web browser application on the computer 102, and the web pages may provide one or more GUI mechanisms such as described above.

The one or more GUI mechanisms may prompt the user to specify a databin (e.g., by indicating an ID of the databin) and to specify data to be added to the databin (e.g., via a text-box, a file selection GUI, etc.). The computer 102 may then generate one or more API calls and send the API calls to the server 152. In some embodiments, the computer 102 may establish a connection with the server 152 as discussed above and send the specified data to the server 152 via the connection.

Responsive to receiving information from the computer 102 indicating that the user seeks to add data to a databin (e.g., via an API, a connection, etc.), the cloud storage management module 190 locates the databin (e.g., with an ID, information regarding the connection, etc.) and stores the data to the databin using techniques such as discussed above, according to an embodiment.

Figure 7:
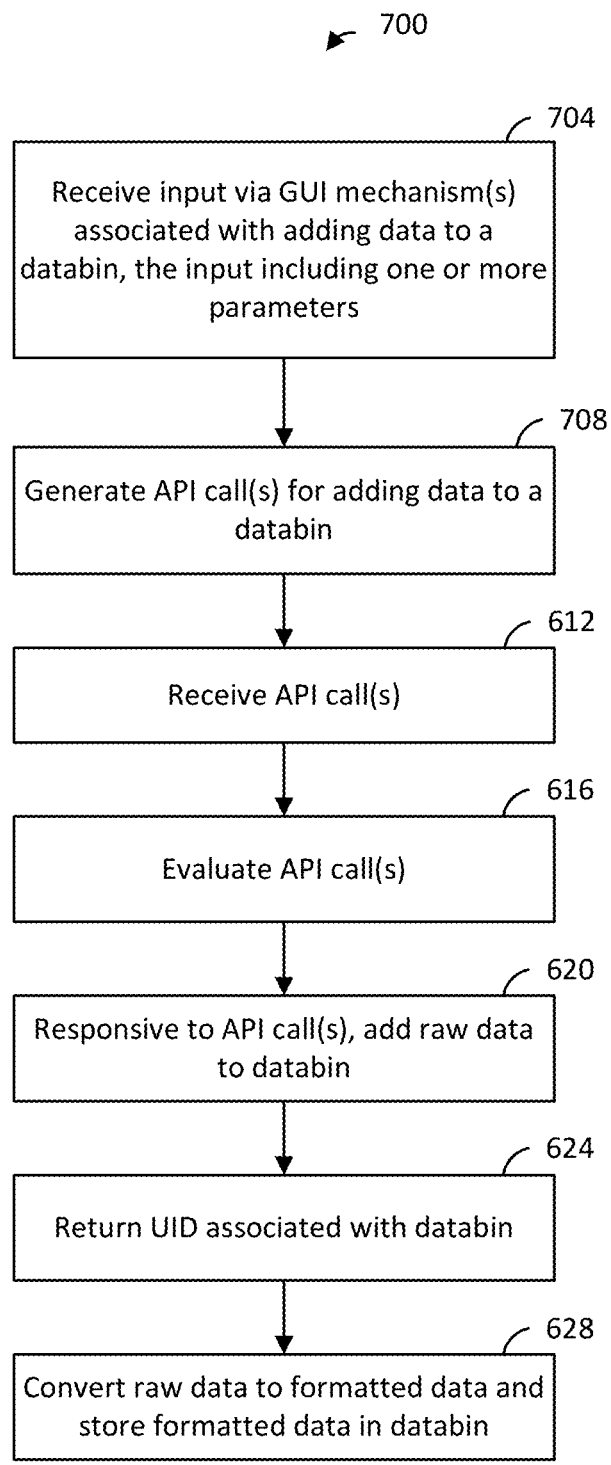
FIG. 7 is a flow diagram of another example method for adding data to a cloud storage object, according to another embodiment.

FIG. 7 is a flow diagram of another example method 700 for adding data to a databin, according to another embodiment. The method 700 may be implemented in the system 100 of FIG. 1, in an embodiment, and the method 700 is described with reference to the system 100 of FIG. 1 for explanatory purposes. In other embodiments, however, the method 700 is implemented in another suitable system. Similarly, in some embodiments, another suitable method for adding data to databins different than the method 700 is implemented in the system 100.

The method 700 includes blocks from the method 600 of FIG. 6, and like-numbered blocks are not discussed for brevity.

At block 704, user input is received via one or more GUI mechanisms associated with adding data to a databin. The user input may include one or more parameters such as an indication of the databin (e.g., an ID of the databin), an indication or indications of data to be added to the databin, etc.

At block 708, using the data received at block 704, one or more API calls are generated, the API call(s) for adding specified data to a specified databin. In some embodiments, the computer 102 may establish a connection with the server 152 as discussed above and send the specified data to the server 152 via the connection.

Similar to the method 600 of FIG. 6, one or more blocks of the method 700 may be omitted, blocks may be rearranged, one or more additional blocks may be added, etc., according to various embodiments.

Adding Data via Web API

In some embodiments, data can be added to a databin using a suitable web API, such as a web API that adheres to Representational State Transfer (REST) architectural constraints, sometimes referred to as a RESTful API. For instance, in some embodiments, the server 152 (or another server communicatively coupled to the server 152) may implement a web server module (not shown in FIG. 1) that is configured to handle web API calls.

FIG. 8A illustrates an example RESTful web API call 800 for adding data to a databin, according to an embodiment. The example of FIG. 8A corresponds to the example of FIG. 5A. In particular, the web API call 800 is for adding data "1234" to the databin corresponding to the short ID "3unzwh_n".

The web API call 800 includes a base universal resource locator (URL) 804 for adding data to databins. The web API call 800 also includes a query portion 806. The query portion 806 includes a portion 808 utilized for specifying the databin to which data is to be added. In this example, the portion 808 includes a keyword "bin", an operator "=", and a short ID of the databin "3unzwh_n". The query portion 806 also includes a portion 812 utilized for specifying the data to be added to the databin. In this example, the portion 812 includes a key "data", an operator "=", and the data to be added "1234". The portion 808 and the portion 812 are separated by a demarcation operator "&".

FIG. 8B illustrates another example RESTful web API call 840 for adding data to a databin, according to an embodiment. The example of FIG. 8B corresponds to the example of FIG. 5B. In particular, the web API call 840 is for adding the data tuple "nyc" and "20.4" to the databin corresponding to the short ID "3un8fjEr".

The web API call 840 includes the base URL 804 for adding data to databins. The web API call 840 also a query portion 842. The query portion 842 includes a portion 844 utilized for specifying the databin to which data is to be added. In this example, the portion 844 includes a keyword "bin", an operator "=", and a short ID of the databin "3un8fjEr". The query portion 842 also includes a portion 848 utilized for specifying the data to be added to the databin. In this example, the portion 848 includes a subportion 852 and a subportion 856. The subportion 852 includes a key "city", an operator "=", and the data to be added "nyc". The "=" operator indicates that the data "nyc" is associated with the key "city". The subportion 856 includes a key "temp", an operator "=", and the data to be added "20.4". The "=" operator indicates that the data "20.4" is associated with the key "temp". The portion 844 and the portion 848 are separated by the demarcation operator 816. Also, the subportion 852 and the subportion 856 are separated by the demarcation operator 816.

Referring now to FIG. 1, upon receiving an HTTP request corresponding to a web API call for adding data to a databin, a web server module running on the server 152 and/or the cloud storage management module 190 parses a query in the HTTP request (e.g., the query 806 or the query 842) to determine the specified databin and the specified data. For example, parsing the query may include identifying one or more keywords (e.g., "bin"), operators (e.g., "=", "&", etc.), and utilizing the identified keyword(s) and operator(s) to parse the query. The cloud storage management module 190 then uses the parsed information to locate the specified databin and store the specified data to the specified databin.

Adding Data via Email

Referring again to FIG. 1, in some embodiments, data can be added to a databin using email. For instance, in some embodiments, the computer 102 may implement an email application and a user can specify a databin and data to be added to the databin using an email message. In some embodiments, the server 152 (or another server communicatively coupled to the server 152) may implement an email server module (not shown in FIG. 1), and the server 152 may receive emails corresponding to requests to add data to databins, and, in response, store the specified data to the specified databins.

For example, in an embodiment, a user can add data to a databin using email by: i) addressing an email message to an email address corresponding to adding data to databins, ii) including an identifier of the databin in a subject line of the email message, iii) including the data to be added to the databin in a body of the email message, and iv) sending the email message.

Figure 9A:
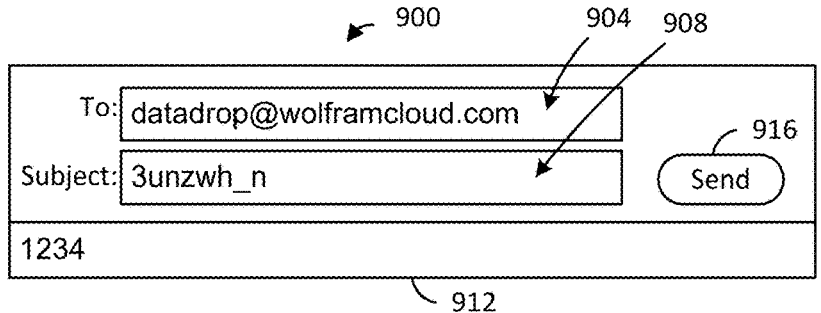
FIG. 9A illustrates an example in which data is added to a cloud storage object using email, according to an embodiment.

FIG. 9A illustrates an example GUI 900 of an email application utilized to add data to a databin, according to an illustrative embodiment. The example of FIG. 9A corresponds to the examples of FIGS. 5A and 8A. In particular, the example of FIG. 9A illustrates adding data "1234" to the databin corresponding to the short ID "3unzwh_n".

In the example of FIG. 9A, the GUI 900 includes a text box 904 for entering a recipient email address. In the example of FIG. 9A, the recipient email address is an email address corresponding to adding data to databins (e.g., datadrop@wolframcloud.com). The GUI 900 also includes a text box 908 for entering a subject line for the email. In the example of FIG. 9A, the subject line includes the short ID of the databin to which data is to be added. The GUI 900 also includes a text box 912 for drafting the body of the email. In the example of FIG. 9A, the text box 912 includes the data to be added, i.e., "1234". The GUI 900 further includes a button 916 that, when activated, causes the email message to be sent.

Figure 9B:
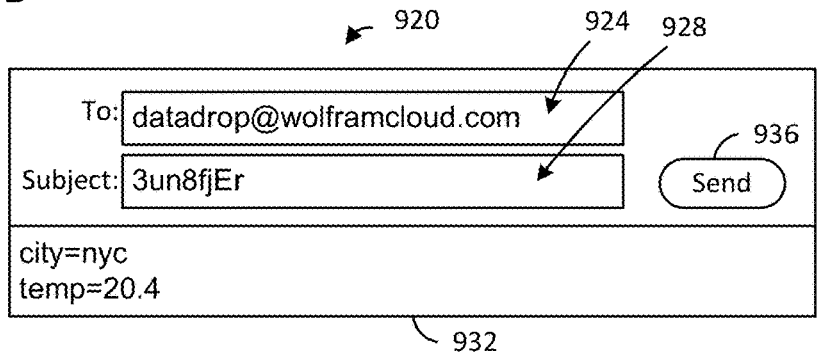
FIG. 9B illustrates another example in which data is added to a cloud storage object using email, according to another embodiment.

FIG. 9B illustrates another example GUI 920 of an email application utilized to add data to a databin, according to an illustrative embodiment. The example of FIG. 9B corresponds to the examples of FIGS. 5B and 8B. In particular, the example of FIG. 9B illustrates adding the data tuple "nyc" and "20.4" to the databin corresponding to the short ID "3un8fjEr".

In the example of FIG. 9B, the GUI 920 includes a text box 924 for entering a recipient email address. In the example of FIG. 9B, the recipient email address is an email address corresponding to adding data to databins (e.g., datadrop@wolframcloud.com). The GUI 920 also includes a text box 928 for entering a subject line for the email. In the example of FIG. 9B, the subject line includes the short ID of the databin to which data is to be added. The GUI 920 also includes a text box 932 for drafting the body of the email. In the example of FIG. 9B, the text box 932 includes the data to be added, i.e., "city=nyc" and "temp=20.4"). The GUI 920 further includes a button 936 that, when activated, causes the email message to be sent.

In an embodiment, when data is to be associated with keys, an operator "=" is utilized to indicate the association. For example, the association between the key "city" and the value "nyc" is indicated by the operator "=". In other embodiments, other suitable operators may be utilized to indicate an association between keys and values. In an embodiment, different data are separated with line breaks. In other embodiments, however, other suitable demarcation operators may be utilized such as commas, semicolons, spaces, etc.

Figure 9C:
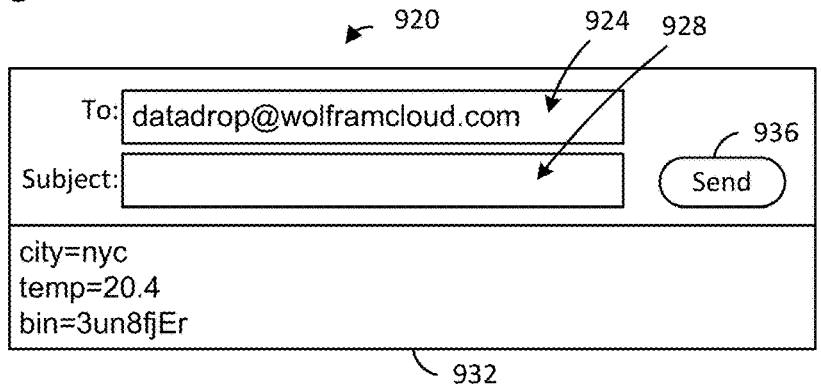
FIG. 9C illustrates another example in which data is added to a cloud storage object using email, according to another embodiment.

As another example, in an embodiment, a user can add data to a databin using email by: i) addressing an email message to an email address corresponding to adding data to databins, ii) including in the body of the email message a) an identifier of the databin, and b) the data to be added to the databin, and iii) sending the email message. For instance, in the example of FIG. 9C, text box 928 for the subject line is left blank. In the text box 932, however, an indication of the databin is included, i.e., "bin=3un8fjEr". In an embodiment, when a databin is to be specified in the body of the email message, the operator "bin=" is utilized to indicate that the following text correspond to an ID of a databin. In other embodiments, other suitable operators may be utilized to indicate text corresponds to a databin identifier.

Figure 9D:
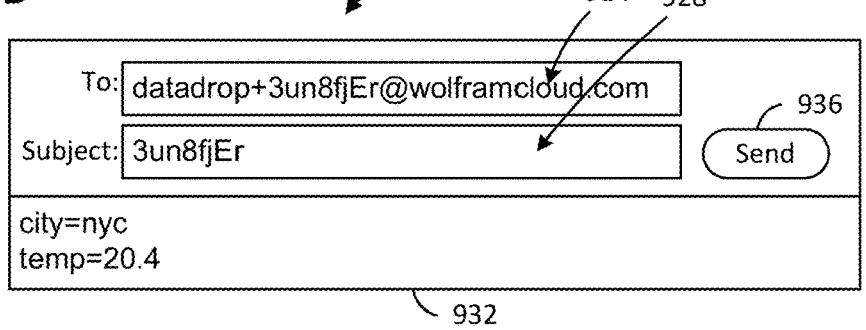
FIG. 9D illustrates yet another example in which data is added to a cloud storage object using email, according to yet another embodiment.

As yet another example, in an embodiment, a user can add data to a databin using email by: i) addressing an email message to an email address corresponding to adding data to databins and also specifying a particular databin, ii) including in the body of the email message the data to be added to the databin, and iii) sending the email message. For instance, in the example of FIG. 9D, the recipient email address includes the databin ID "3un8fjEr". In an embodiment, when a databin is to be specified in the recipient email address, the operator "+" is included after the base email address and is utilized to indicate that the following text (prior to the "@" operator) correspond to an ID of a databin. In other embodiments, other suitable operators may be utilized to indicate text in the email address corresponds to a databin identifier.

Referring now to FIG. 1, upon receiving an email message corresponding to a web API call for adding data to a databin, an email server module running on the server 152 and/or the cloud storage management module 190 parses the email message to determine the specified databin and the specified data. For example, parsing the query may include identifying one or more keywords (e.g., "bin"), operators (e.g., "=", "+", space, etc.), and utilizing the identified keyword(s) and operator(s) to parse the email message. The cloud storage management module 190 then uses the parsed information to locate the specified databin and store the specified data to the specified databin.

Adding Data via Twitter®

Referring again to FIG. 1, in some embodiments, data can be added to a databin using suitable messaging applications other than email, such as a social media application or another suitable messaging application. For instance, in some embodiments, the computer 102 may implement a Twitter® application and a user can specify a databin and data to be added to the databin using a Twitter® message. In some embodiments, the server 152 (or another server communicatively coupled to the server 152) may implement a Twitter® application module (not shown in FIG. 1), and the server 152 may receive twitter messages corresponding to requests to add data to databins, and, in response, store the specified data to the specified databins.

For example, in an embodiment, a user can add data to a databin using a Twitter® message by: i) addressing a Twitter® message to a username corresponding to adding data to databins, ii) including an identifier of the databin in the Twitter® message, iii) including the data to be added to the databin in the Twitter® message, and iv) sending the Twitter® message.

Figure 10A:
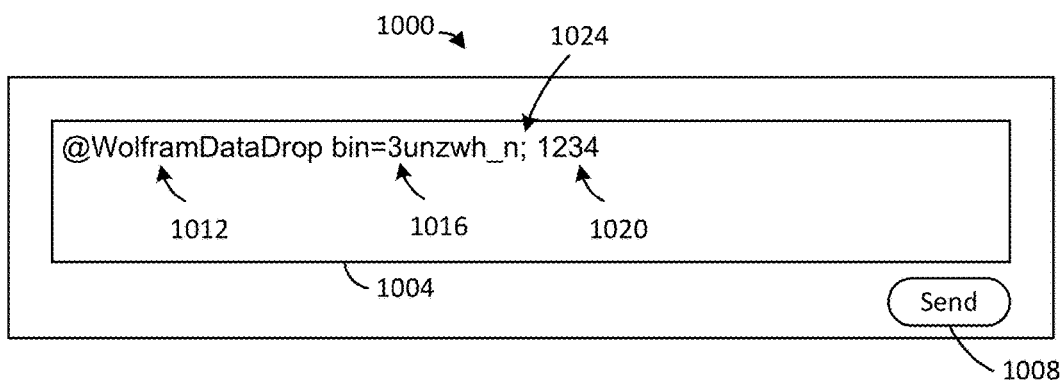
FIG. 10A illustrates an example in which data is added to a cloud storage object using Twitter®, according to an embodiment.

FIG. 10A illustrates an example GUI 1000 of a Twitter® application utilized to add data to a databin, according to an illustrative embodiment. The example of FIG. 10A corresponds to the examples of FIGS. 5A, 8A, and 9A. In particular, the example of FIG. 10A illustrates adding data "1234" to the databin corresponding to the short ID "3unzwh_n".

In the example of FIG. 10A, the GUI 1000 includes a text box 1004 for entering a recipient user ID and text to be included in the message. The GUI 1000 also includes a button 1008 that, when activated, causes the message to be sent.

In the example of FIG. 10A, a recipient user ID 1012 has been added to the text box 1004. The recipient user ID 1012 is a user ID corresponding to adding data to databins (e.g., @WolframDataDrop). The text box 1004 also includes the short ID 1016 of the databin to which data is to be added (i.e., "3unzwh_n"). The text box 1004 also includes the data 1020 to be added, i.e., "1234". In an embodiment, the databin ID 1016 and the data 1020 are demarcated by a semicolon 1024. In other embodiments, another suitable operator may be utilized for demarcating the databin ID 1016 and the data 1020.

Figure 10B:
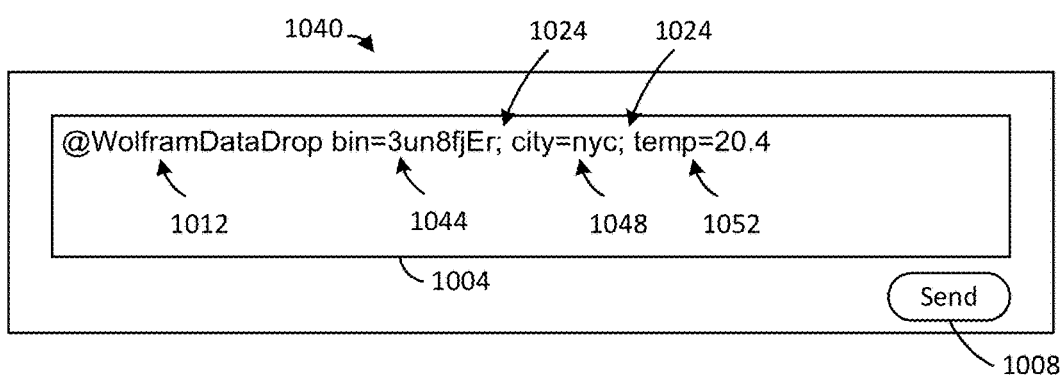
FIG. 10B illustrates another example in which data is added to a cloud storage object using Twitter®, according to another embodiment.

FIG. 10B illustrates another example GUI 1040 of a Twitter® application utilized to add data to a databin, according to an illustrative embodiment. The example of FIG. 10B corresponds to the examples of FIGS. 5B, 8B, and 9B. In particular, the example of FIG. 10B illustrates adding data tuples "city"->"nyc" and "temp"->20.4 to the databin corresponding to the short ID "3un8fjEr".

In the example of FIG. 10B, the GUI 1040 includes the text box 1004 and the button 1008 as in the example of FIG. 10A. The recipient user ID 1012 has been added to the text box 1004. The text box 1004 also includes the short ID 1044 of the databin to which data is to be added (i.e., "3un8fjEr"). The text box 1004 also includes the data 1048, 1052 to be added, i.e., city=nyc and temp=20.4. In an embodiment, the databin ID 1044, the data 1048, and the data 1052 are demarcated by semicolons 1024. In other embodiments, another suitable operator may be utilized for demarcating the databin ID 1044 from the data 1048, 1052, and/or demarcating the data 1048 from the data 1052.

In an embodiment, when data is to be associated with keys, an operator "=" is utilized to indicate the association. For example, the association between the key "city" and the value "nyc" is indicated by the operator "=". In other embodiments, other suitable operators may be utilized to indicate an association between keys and values. In an embodiment, different data are separated with line breaks. In other embodiments, however, other suitable demarcation operators may be utilized such as commas, semicolons, spaces, etc.

Referring now to FIG. 1, a Twitter® application module (not shown) running on the server 152 obtains a Twitter® message using a Twitter® API, in an illustrative embodiment. For example, in an embodiment, the Twitter® application module uses the Twitter® API to obtain, from a Twitter® server, Twitter® messages addressed to a particular user ID (e.g., @WolframDataDrop). The Twitter® application module and/or the cloud storage management module 190 parses the Twitter® message to determine the specified databin and the specified data. For example, parsing the query may include identifying one or more keywords (e.g., "bin"), operators (e.g., "=", ";", space, etc.), and utilizing the identified keyword(s) and operator(s) to parse the Twitter® message. The cloud storage management module 190 then uses the parsed information to locate the specified databin and store the specified data to the specified databin.

Adding Data with a Sensor Device

Referring again to FIG. 1, in some embodiments, the sensor device 198 can add data to a databin using a suitable API, such as the web API discussed above with reference to FIGS. 8A and 8B.

Figure 11:
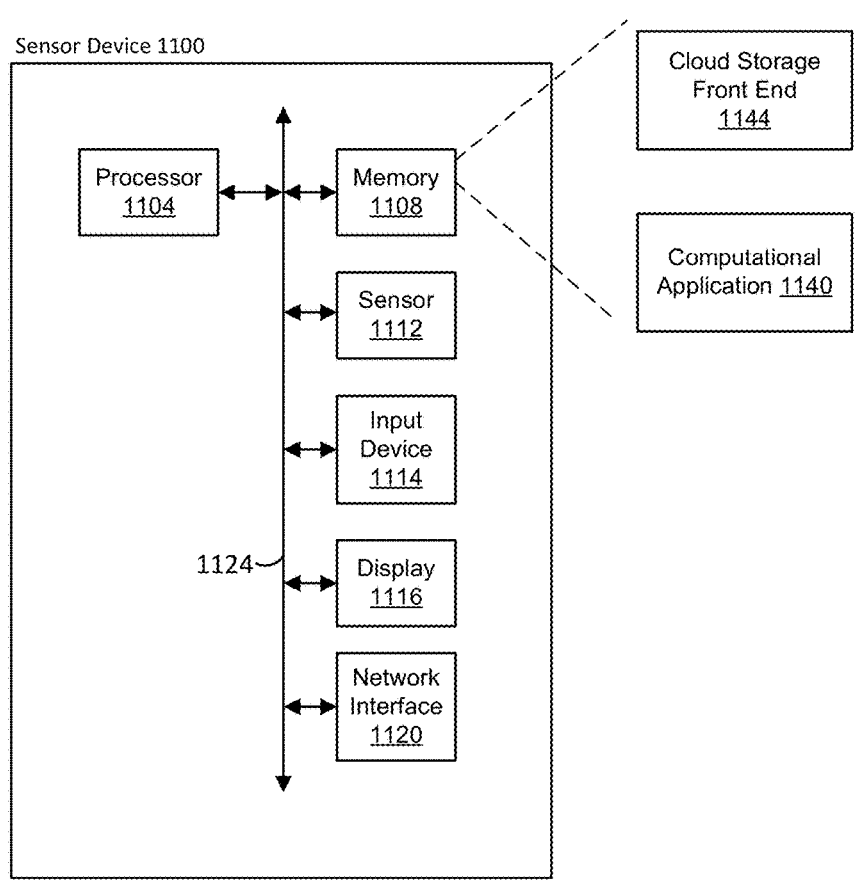
FIG. 11 is a block diagram of a sensor device that is configured to add data to a cloud storage object, according to an embodiment.

FIG. 11 is a block diagram of an example sensor device 1100, according to an embodiment. The sensor device 1100 may be utilized as the sensor device 198 of FIG. 1, according to some embodiments. The sensor device 1100 may be configured to add data to a databin using a suitable API, such as the web API discussed above with reference to FIGS. 8A and 8B.

The sensor device 1100 includes one or more processors 1104 (sometime referred to herein as "the processor 1104" for brevity) and one or more memory devices 1108 (sometime referred to herein as "the memory 108" for brevity).

The sensor device 1100 also includes, or is coupled to, one or more sensors 1112 for measuring real world physical parameters such as temperature, pressure, sound, motion, light, speed, acceleration, geographic position, physical orientation, etc. Thus, in various embodiments, the one or more sensors 1112 include one of, or any suitable combination of two or more of, a temperature sensor, a pressure sensor, a microphone, a motion sensor, a light sensor, a camera sensor, an accelerometer, a magnetometer, a gyroscopic sensor, a current sensor, a voltage sensor, an electrical power sensor, a position sensor, a chemical sensor, etc.

The sensor device 1100 may include, or be coupled to, one or more input devices 1114. For example, in some embodiments, the sensor device 1100 may include one of, or any suitable combination of two or more of, a keypad, one or more buttons, one or more knobs, one or more sliders, a touch screen that overlays a display device, etc. In other embodiments, however, the sensor device 1100 omits the one or more input devices 1114. In some embodiments, the sensor device 1100 may include, or be coupled to, one or more display devices 1116. In other embodiments, however, the sensor device 1100 omits the one or more display devices 1116.

In some embodiments, the sensor device 1100 includes one or more network interface devices 1120, such as one of, or any suitable combination of two or more of, a WiFi network interface, a mobile telephony network interface, a personal area network (PAN) network interface (e.g., a Bluetooth® network interface), an Ethernet network interface, a positioning system radio (e.g., a GPS radio), etc. The processor 1104, the memory device 1108, the one or more sensor devices 1112 (sometime referred to herein as "the sensor device 112" for brevity), the one or more input devices 1114 (sometime referred to herein as "the input device 1114" for brevity), the one or more display devices 1116 (sometime referred to herein as "the display device 1116" for brevity), the one or more network interface devices 1120 (sometime referred to herein as "the network interface device 1120" for brevity), etc., may be communicatively coupled via one or more busses 1124 (sometime referred to herein as "the bus 1124" for brevity). In other embodiments, the sensor device 1100 may have other suitable structures and/or components.

The processor 1104 may comprise one or more general purpose processors (e.g., a central processing unit), one or more special purpose processors (e.g., a co-processor, an embedded processor, etc.). At least one of the processor(s) 1104 executes machine readable instructions stored in the memory 1108. The memory device(s) 1108 include one or more of RAM, ROM, a FLASH memory, etc.

In some embodiments, the memory 1108 may store a cloud storage front end module 1144 that enables adding data to databins, according to various embodiments. In some embodiments, the cloud storage front end 1144 may be the same as the cloud storage front end 144 discussed above, or a reduced-size, reduced-functionality version of the cloud storage front end 144. For example, in an embodiment, the cloud storage front end module 1144 may enable adding data to already existing databins, but is not configured for creating databins.

In some embodiments, the memory 1108 may store a computational application 1140. In some embodiments, the computational application 1140 may be same as the computational application 140 of FIG. 1, or a reduced-size, reduced-functionality version of the computational application 140. In some embodiments, the cloud storage front end module 1144 is included in the computational application 1140. In some embodiments, however, the computational application 1140 is omitted and the cloud storage front end 1144 is a standalone application and/or module. In some embodiments, the cloud storage front end 1144 is incorporated into another suitable application different than the computational application 1140.

In various embodiments, the sensor device 1100 may be a standalone device, or may be included in another device or system such as a still photo camera, a video camera, a security system, an air conditioning/heating control system, etc.

In some embodiments, the cloud storage front end 1144 can, when executed by the processor 1104, add data to a databin using a suitable API, such as the web API discussed above with reference to FIGS. 8A and 8B. For example, the cloud storage front end 1144 may, when executed by the processor 1104, cause the sensor device 1100 to send API calls for adding data to a databin to be sent to the server 152 via the network 150 using the network interface device 1120. In some embodiments, the cloud storage front end 1144 may establish a connection with the server 152 as discussed above and send the specified data to the server 152 via the connection.

In some embodiments, the cloud storage front end 1144 may be included in the memory 1108 and already configured, upon sale of the sensor device 1100, for storing data to a databin. For example, a manufacturer of, a distributor of, etc., the sensor device 1100 may create databins, or have a databins created, for sensor devices 1100 to be sold, distributed, etc. Additionally, the cloud storage front end 1144 may be already configured, upon the sensor device 1100 being turned on by a user, with a databin ID, key/value association(s), etc., corresponding to a created databin so that the cloud storage front end 1144 can cause the sensor device 1100 to transmit API calls, establish a connection, send data to the server 152 via such a connection, etc., to add data to the already created databin after establishing a network connection to the network 150. For example, the cloud storage front end 1144 may be configured to cause such API calls to be transmitted, to send data to a socket, etc., periodically and/or in response to specific events, such as events detected by the sensor device 1100. In some embodiments, the sensor device 1100 may thus begin storing data to an already created databin shortly after the sensor device 1100 is turned on by a user and the sensor device 1100 has established a connection to the network 150.

Similarly, in some embodiments, the cloud storage front end 1144 may be included in the memory 1108 and already configured, upon sale of the sensor device 1100, for creating a databin and then storing data to the created databin. Additionally, the cloud storage front end 1144 may be already configured, upon the sensor device 1100 being turned on by a user, to cause the sensor device 1100 to transmit API calls for creating a databin and then adding data to the created databins after establishing a connection to the network 150. For example, the cloud storage front end 1144 may be configured to cause API calls for storing data to a databin to be transmitted periodically and/or in response to specific events, such as events detected by the sensor device 1100. As another example, the cloud storage front end 1144 may be configured to establish a connection with the server 152 and send data to a socket associated with the connection periodically and/or in response to specific events, such as events detected by the sensor device 1100. In some embodiments, the sensor device 1100 may thus create a databin and begin storing data to the databin shortly after the sensor device 1100 is turned on by a user and the sensor device 1100 has established a connection to the network 150.

In some embodiments, the cloud storage front end 1144 may be included in the memory 1108 and already configured, upon sale of the sensor device 1100, for receiving a databin ID from a user and then storing data to a databin corresponding to the received databin ID. For example, a user may create a databin using the computer 102, for example. Additionally, the cloud storage front end 1144 may be already configured, upon the sensor device 1100 being turned on by a user, to prompt the user to provide the databin ID and optionally key/value association(s), etc., corresponding to the created databin so that the cloud storage front end 1144 can cause the sensor device 1100 to transmit API calls for adding data to the databin, to send data via a connection to the server 152, etc. For example, the cloud storage front end 1144 may be configured to cause such API calls to be transmitted, to send data to a socket, etc., periodically and/or in response to specific events, such as events detected by the sensor device 1100.

In some embodiments, the cloud storage front end 1144 is not present in the memory 1108 when the sensor device 1100 is purchased by the user. Rather, the cloud storage front end 1144 is added to the memory 1108 by the user. For example, the user may download the cloud storage front end 1144 from the server 152 or another server and cause the cloud storage front end 1144 to be stored in the memory 1108. As another example, the user may create the cloud storage front end 1144 and then store the cloud storage front end 1144 in the memory 1108. After the cloud storage front end 1144 is stored in the memory 1108, the cloud storage front end 1144 may operate in a manner such as discussed above, according to some embodiments.

Thus, in some embodiments, a sensor device 1100 is configured to automatically begin storing data in a databin (e.g., periodically, in response to specific events, etc.) responsive to being turned on by a user, for example. A user can then later access the databin. For example, in an embodiment, the cloud storage front end 1144 may be configured to prompt the user with instructions for accessing the databin. Instructions for accessing the databin may include a website address corresponding to the server 152, in an embodiment. Instructions for accessing the databin may include a databin ID corresponding to the databin, in an embodiment.

For instance, in embodiments in which the sensor device 1100 includes a display 1116, the cloud storage front end 1144 may be configured to cause the instructions for accessing the databin to be displayed on the display 1116. In some embodiments, a web page server module (not shown) is stored in the memory 1108, and the sensor device 1100 may be configured to allow a user to interact with the sensor device 1100 via web pages served by the web page server module. For example, the server module may serve web pages that allow a user to change configuration settings of the sensor device 1100, obtain data from the sensor device 1100, etc. For example, a user can utilize a computer (e.g., the computer 102 or a similar computer) to communicate with the sensor device 1100 via WiFi, Ethernet, etc., according to an illustrative embodiment. In such embodiments, the server module may serve web pages that present instructions for accessing the databin.

In some embodiments, instructions for accessing the databin may be printed on packaging in which the sensor device 1100 was shipped and/or sold. In some embodiments, instructions for accessing the databin may be printed on an insert included in the packaging in which the sensor device 1100 was shipped and/or sold. In some embodiments, instructions for accessing the databin may be provided in web page(s) of a website owned, operated, or otherwise associated with a manufacturer or distributer of the sensor device 1100.

In some embodiments, a web server module implemented by the server 152 (or another server) may permit a user to access (e.g., obtain data from, manage settings, etc.) a databin to which a sensor device 1100 is automatically storing data. For example, the web server module may serve a web page(s) with one or more GUI mechanisms that allow a user to specify the sensor device 1100, e.g., with one or more of a unique ID of the sensor device 1100 such as a UUID, a serial number, a manufacture name, a manufacturer ID, etc. As an illustrative example, the web server module and/or the server 152 may maintain a database of sensor device IDs and associated databin IDs. Thus, when a user provides information specifying the sensor device 1100 using the one or more GUI mechanisms, the web server module and/or the server 152 can determine the databin to which the sensor device 1100 is storing data by analyzing the database of sensor device IDs and associated databin IDs. In some embodiments, the web server module may also serve a web page(s) with one or more GUI mechanisms that allow a user to associate the determined databin with the user instead of, or in addition to, the sensor device 1100.

Referring again to FIG. 1, in some embodiments, the cloud storage management module 190 may be implemented as a multi-threaded server module to handle high volume and/or high rate accesses to cloud storage objects 184. For example, different threads may handle different requests to add data to databins, in an embodiment. As a more specific example, different threads may handle different requests to add data to a same databin, in an embodiment.

Accessing Data in Cloud Storage Objects

Referring again to FIG. 1, in some embodiments, the system 100 provides a plurality of mechanisms for accessing data in (e.g., retrieving data from) databins using techniques such as described above (or using other suitable techniques). In such embodiments, the plurality of available mechanisms for accessing data in databins may provide much flexibility for users to access data for analysis by the computational application 140 (and/or a separate data analysis application). For example, in an illustrative embodiment, data in a databin can be accessed i) programmatically via the computational application 140, ii) via one or more web pages served by a web server module implemented by the server 152 (or another server coupled to the server 152), etc.

In other embodiments, the system only provides one of, or a subset of, the mechanisms for accessing data in databins discussed above, and/or provides one or more other suitable mechanisms.

Accessing Data Programmatically

In some embodiments, the computational application 140 provides a built-in function and/or built-in mechanisms for accessing data in databins. For example, the computational application 140 may provide a built-in function with a descriptive keyword such as "Databin", where the built-in function is for accessing data in cloud storage objects 184 (e.g., databins). Thus, in some embodiments, a user can utilize the computational application 140 and the Databin function to access data in cloud storage objects 184 ("databins"). For example, in an embodiment, in response to a user entering the built-in function Databin into a workspace such as a notebook and causing the computational application 140 to evaluate the built-in function (e.g., by pressing "Enter" or taking some other suitable action), the computational application 140 interacts with the cloud storage management module 190, causing the cloud storage management module 190 to retrieve data from a specified databin. For example, the computational application 140 may evaluate the Databin function entered within the workspace, where a parameter of the Databin function specifies a particular databin. Responsive to the evaluation, computational application 140 may use an API to cause the cloud storage management module 190 to retrieve data from the specified databin. The cloud storage management module 190 may then send the retrieved data to the computational application 140, e.g., using an API.

Responsive to receiving information from the cloud storage front end 144 indicating that the user seeks to access a specified databin (e.g., via one or more API calls), the cloud storage management module 190 locates the specified data bin in the cloud storage 180 and retrieves data in the databin.

As discussed above, in some embodiments, the Databin function includes an argument that a user can utilize to specify a databin. In an illustrative embodiment, the Databin function has a format as follows:

Databin[bin], where bin is an argument specifying a unique ID associated with a databin. In various embodiments, the argument bin can be of one format or multiple formats, such as one or more of a short ID, a complete UUID, a short URL, a long URL, etc. In some embodiments, the Databin function optionally includes one or more other arguments that a user can utilize to specify which data in the databin are to be accessed. In an illustrative embodiment, the Databin function has a format as follows:

Databin[bin, params], where bin is the argument specifying a unique ID associated with a databin, and params are one or more other parameters specifying which data in the databin are to be accessed. In some embodiments, the one or more other parameters may specify a range of entries in terms of an entry index or index range. In some embodiments, the one or more other parameters may specify a range of entries in terms of time. In some embodiments, the one or more other parameters may specify a range of entries in terms of keys. Several example parameters that may be utilized are set forth below. In various embodiments, one, several, all, or none of the following parameters may be utilized:

Databin[bin, n]
where n indicates the first n entries in a databin.
Databin[bin, −n]
where −n indicates the most recent n entries in a databin.
Databin[bin, {m, n}]
where m and n indicates entries m through n in a databin, with negative numbers counting from the end (i.e., most recent entries).
Databin[bin, {m, n, s}]
where {m, n, s} indicates entries m through n with step s.
Databin[bin, time]
where time indicates entries going back for the quantity of time specified by time.
Databin[bin, date]
where date indicates entries from the specified date to now.

Databin[bin, {date1, date2}]
where [date1], date2) indicates entries in a databin between the specified dates, inclusive.
Databin[bin, range, {"key1", "key2", . . . }]
where range indicates a specified range of entries (using parameters such as described above), and {"key1", "key2", . . . } indicates only elements in the databin associated with keys "key1", "key2", . . .

The cloud storage management module 190 is configured to utilize the ID in the one or more API calls to locate the specified data bin in the cloud storage 180. Additionally, in some embodiments, the cloud storage management module 190 is configured to utilize other parameters, if present, in the one or more API calls to determine which data in the specified databin are to be retrieved. The cloud storage management module 190 then retrieves the specified data from the specified databin.

In an embodiment, after the cloud storage management module 190 retrieves data from the databin, the cloud storage management module 190 returns the data to the cloud storage front end 144 (e.g., via one or more API calls, via a connection, etc.). Thus, in an embodiment, responsive to evaluation of the Databin function in a workspace (e.g., a notebook), the computational application 140 displays and/or makes available the returned data in the workspace. In an embodiment in which the computational application 140 is configured to internally represent different types of data as symbolic expressions, databins themselves are represented as symbolic expressions. Thus, in some embodiments and/or scenarios, responsive to evaluation of the Databin function in a workspace (e.g., a notebook), the computational application 140 returns a symbolic databin object to the same workspace. In some embodiments, responsive to evaluation of the Databin function in a workspace (e.g., a notebook), the computational application 140 returns, to the same workspace, data in a format recognized by the computational application 140 so that the data can be operated upon, or processed, by the computational application 140 immediately without first having to import the data into the workspace by some other user-directed action (e.g., a cut and paste operation) and/or without having to first convert the data to the format recognized by the computational application 140 by some other user-directed action (e.g., a convert-to operation, a save-as operation, etc.).

Figure 12:
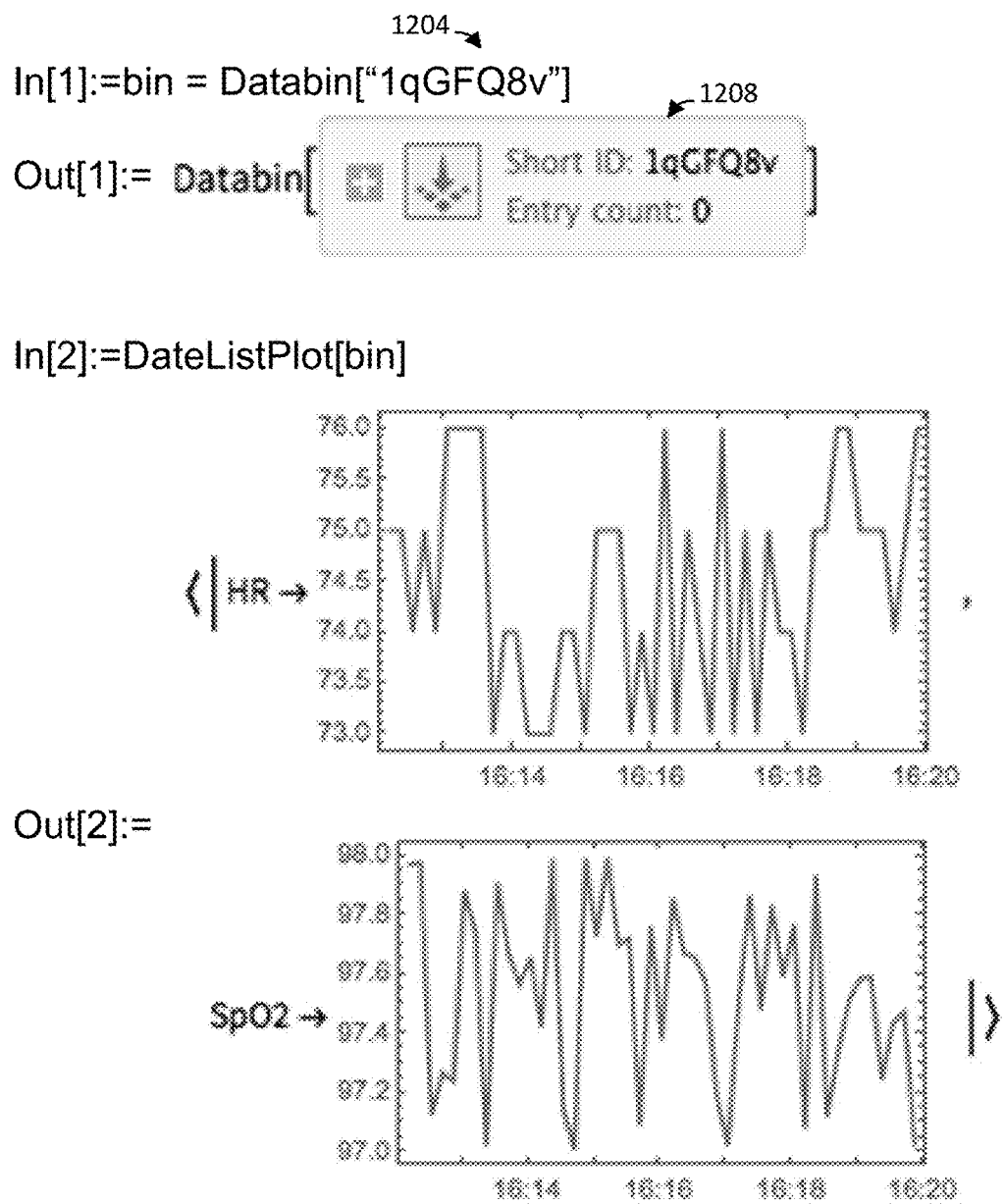
FIG. 12 is an example of programmer input utilized to retrieve data from a cloud storage object and analyze the retrieved data, according to an embodiment.

FIG. 12 is an example notebook in which a programmer utilizes the Databin function to access a databin in the cloud storage 180 (FIG. 1), according to an embodiment. The programmer has entered into the notebook an expression bin=Databin["1qGFQ8v"]. The expression includes an ID 1204 of a databin, e.g., 1qGFQ8v. The computational application 140 evaluates the entered expression and, in response, utilizes an API to cause the cloud storage management module 190 to access the specified databin. For example, the cloud storage front end 144 sends one or more API calls to the cloud storage management module 190 via the network 150. Next, the cloud storage management module 190 locates the databin using the ID 1204, and retrieves data from the databin. Next, the cloud storage management module 190 returns the retrieved data to the cloud storage management module 190 via the network 150.

The computational application 140 makes the retrieved data available for processing in the notebook. In an embodiment, the retrieved data is in a format that is recognized by the computational application 140 so that the retrieved data can be immediately processed by the computational application 140 without other user-directed action being required, such as a user-directed action to import the data into the workspace, a user-directed action to convert the data to a new format, etc. In the example of FIG. 12, the computational application 140 sets the variable "bin" equal to a symbolic databin object corresponding to the retrieved data from the databin. The computational application 140 adds a graphic 1208 to the notebook to visually represent the symbolic databin object in the notebook.

In the example of FIG. 12, the programmer utilizes a DateListPlot function to analyze the retrieved databin. DateListPlot is a built-in function of computational application 140 that has the following format:

DateListPlot[{date1, v1}, {date2, v2}, . . . ]

where values v are associated with dates date. The DateListPlot function plots the values v with respect to the associated dates. In the example of FIG. 12, the databin includes first values associated with a key "HR" and second values associated with a key "SpO2". Additionally, as discussed above, each entry in a databin is associated with a timestamp, at least in some embodiments. Thus, in some embodiments, the DateListPlot function may utilize the timestamps of entries to generate plots of each of the first values associated with a key "HR" and second values associated with a key "SpO2", as shown in FIG. 12. Moreover, in some embodiments, the DateListPlot function may utilize the key associations of entries to determine that separate plots i) for the first values associated with a key "HR" and ii) for the second values associated with a key "SpO2", should be generated. Thus, the computational application 140 utilizes knowledge of the format of the databin to intelligently process data in the databin.

Figure 13:
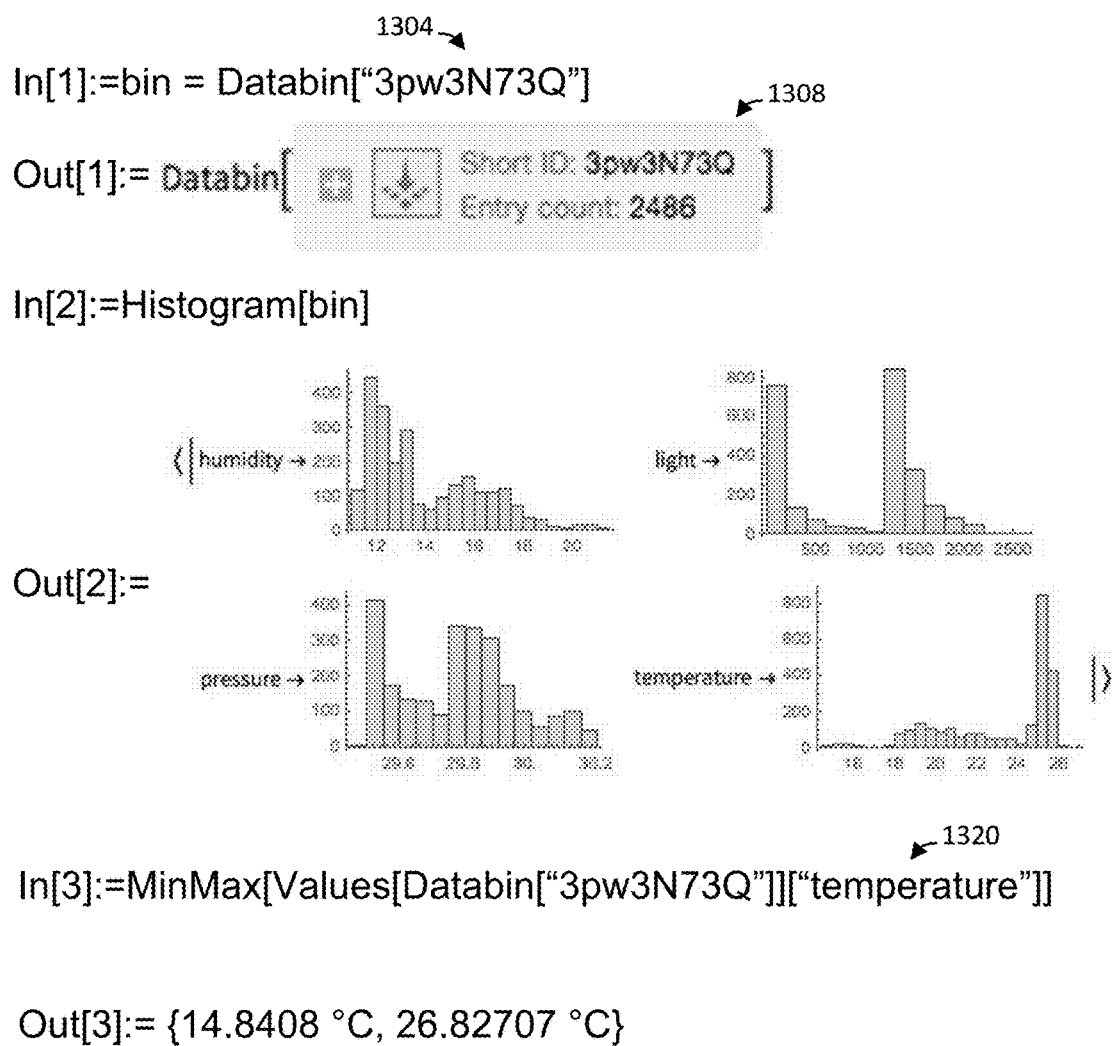
FIG. 13 is another example of programmer input utilized to retrieve data from a cloud storage object and analyze the retrieved data, according to an embodiment.

FIG. 13 is an example notebook in which a programmer utilizes the Databin function to access a databin in the cloud storage 180 (FIG. 1), according to an embodiment. The programmer has entered into the notebook an expression bin=Databin["3pw3N73Q"]. The expression includes an ID 1304 of a databin, e.g., 3pw3N73Q. The computational application 140 evaluates the entered expression and, in response, utilizes an API to cause the cloud storage management module 190 to access the specified databin. For example, the cloud storage front end 144 sends one or more API calls to the cloud storage management module 190 via the network 150. Next, the cloud storage management module 190 locates the databin using the ID 1304, and retrieves data from the databin. Next, the cloud storage management module 190 returns the retrieved data to the cloud storage management module 190 via the network 150.

The computational application 140 makes the retrieved data available for processing in the notebook. In an embodiment, the retrieved data is in a format that is recognized by the computational application 140 so that the retrieved data can be immediately processed by the computational application 140 without other user-directed action being required, such as a user-directed action to import the data into the workspace, a user-directed action to convert the data to a new format, etc. In the example of FIG. 13, the computational application 140 sets the variable "bin" equal to a symbolic databin object corresponding to the retrieved data from the databin. The computational application 140 adds a graphic 1308 to the notebook to visually represent the symbolic databin object in the notebook.

In the example of FIG. 13, the programmer then utilizes a Histogram function to analyze the retrieved databin. Histogram is a built-in function of the computational application 140 that has the following format:

Histogram [{v1, v2, . . . }]

where a histogram of values v is generated. Additionally, the Histogram function may have the following alternative format:

Histogram [{data1, data2, . . . }]

where multiple histograms of data sets data are generated.

In the example of FIG. 13, the databin includes first values associated with a key "Humidity", second values associated with a key "Light", third values associated with a key "Pressure", and fourth values associated with a key "Temperature". Thus, in some embodiments, in some embodiments, the Histogram function may utilize the key associations of entries to determine that separate histograms i) for the first values associated with a key "Humidity", ii) for the second values associated with a key "Light", iii) for the third values associated with a key "Pressure", and iv) for the fourth values associated with the key "Temperature", should be generated. Thus, the computational application 140 utilizes knowledge of the format of the databin to intelligently process data in the databin.

In the example of FIG. 13, the programmer then utilizes a MinMax function to analyze data in the retrieved databin. MinMax is a built-in function of the computational application 140 that has the following format:

MinMax [list]

where the function determines the minimum value in the list and the maximum value in the list, and then returns a list having the minimum value and the maximum value.

The programmer further utilizes a Values function, within the MinMax function. Values is a built-in function of the computational application 140 that has the following format:

Values [list][key]

where the function extracts values from a list that are associated with the key, and then returns a list having the extracted values.

In the example of FIG. 13, the programmer used the key 1320 (temperature) with the Values function, and thus the Values function extracts all of the values in the databin that are associated with the key Temperature. Additionally, the MinMax function determines, from among the values in the databin that are associated with the key Temperature, the minimum value and the maximum value. Thus, the computational application 140 returns a list having the minimum Temperature value and the maximum Temperature value in the databin. Accordingly, the computational application 140 utilizes knowledge of the format of the databin to intelligently process data in the databin.

Figure 14:
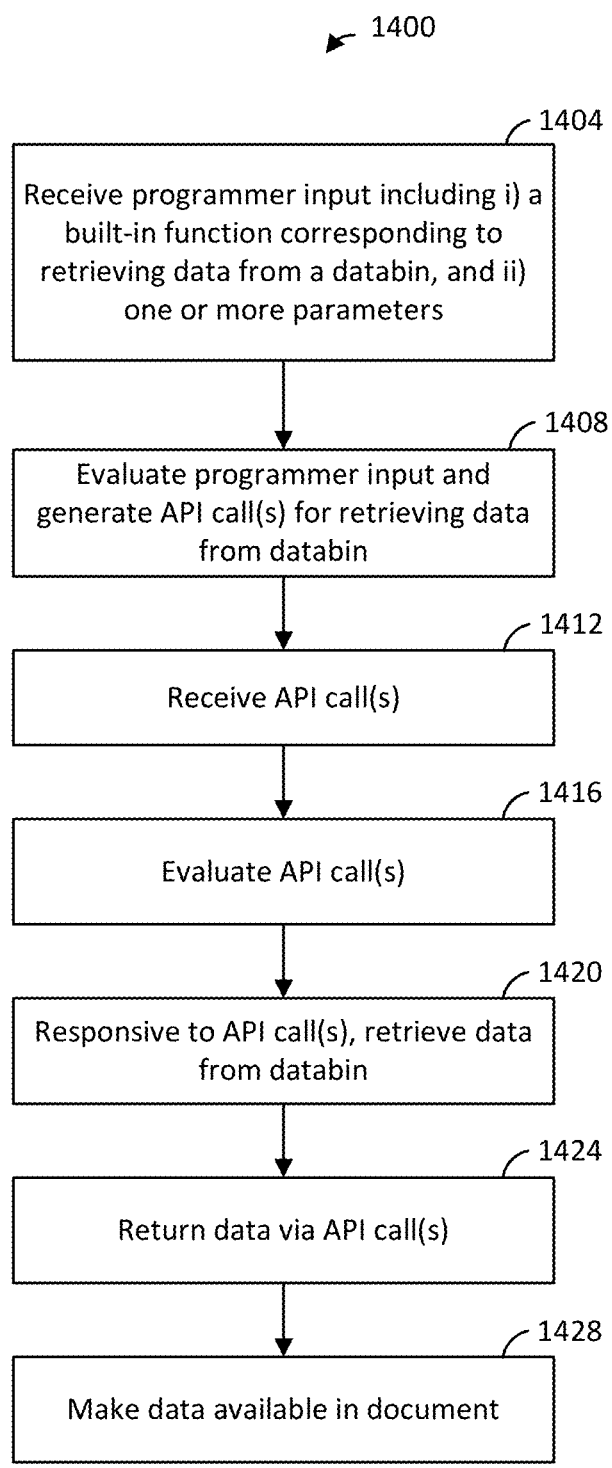
FIG. 14 is a flow diagram of an example method for retrieving data from a cloud storage object, according to another embodiment.

FIG. 14 is a flow diagram of an example method 1400 for retrieving data from a databin, according to an embodiment. The method 1400 may be implemented in the system 100 of FIG. 1, in an embodiment, and the method 1400 is described with reference to the system 100 of FIG. 1 for explanatory purposes. In other embodiments, however, the method 1400 is implemented in another suitable system. Similarly, in some embodiments, another suitable method for retrieving data from databins different than the method 1400 is implemented in the system 100.

At block 1404, programmer input corresponding to a built-in function of the computational application 140 is received, where the built-in function is for retrieving data from databins. In an embodiment, the programmer input may include i) a keyword (e.g., Databin) corresponding to the built-in function, and ii) one or more parameters of the built-in function such as described above. For example, a first parameter may indicate the databin. In some embodiments and/or scenarios, a second parameter (or parameters) may indicate which data in the databin is to be retrieved. The programmer input may be received via one or more user input devices of the computer 102, and input into a document such as a notebook, a spreadsheet, etc.

At block 1408, the programmer input is evaluated by the computational application 140, and, responsive to the evaluation, one or more API calls may be generated by the cloud storage front end module 144, where the one or more API calls correspond to requests for data to be retrieved from the specified databin, and the one or more API calls optionally may include indication(s) of one or more parameters such as described above.

The one or more API calls may be transmitted from the computer 102 to the server 152 via the network 150. At block 1412, the API call(s) are received by the server 152.

At block 1416, the one or more API calls are evaluated by the cloud storage management module 190, and, responsive to the evaluation, data is retrieved from the databin at block 1420.

At block 1424, the cloud storage management module 190 may return the retrieved data to the cloud storage front end module 144 according to an API. For example, the retrieved data may be transmitted by the server 152 to the computer 102 via the network 150, in an embodiment.

At block 1428, the computational application may make the retrieved data available in the document. In an embodiment, the retrieved data is in a format that is recognized by the computational application 140 so that the retrieved data can be immediately processed by the computational application 140 without other user-directed action being required, such as a user-directed action to import the data into the workspace, a user-directed action to convert the data to a new format, etc.

In various other embodiments, one or more blocks of the method 1400 may be omitted, blocks may be rearranged, one or more additional blocks may be added, etc.

Accessing Data via Web Page, App, etc.

In some embodiments, data in a databin can be accessed using a GUI implemented by the computer 102 (FIG. 1), where the GUI utilizes one or more suitable GUI mechanisms, such as one or more of i) one or more buttons, ii) one or more hypertext links, iii) one or more pull-down menus, iv) one or more pop-up menus, v) one or more text boxes, etc. Referring again to FIG. 1, in an embodiment, in response to a selecting to retrieve data from a databin with the GUI, the computer 102 interacts with the cloud storage management module 190, causing the cloud storage management module 190 to retrieve data from the databin. For instance, the GUI may be implemented using a web browser application executed by the computer 102, in an embodiment. As another example, the GUI may be implemented using a mobile app executed by the computer 102, in an embodiment. In embodiments in which the GUI is implemented using a web browser application, the server 152 (or another server communicatively coupled to the server 152) may implement a web server module (not shown in FIG. 1) that serves web pages to the web browser application on the computer 102, and the web pages may provide one or more GUI mechanisms such as described above.

The one or more GUI mechanisms may prompt the user to specify a databin (e.g., by indicating an ID of the databin, selecting a databin from a list, selecting a button requesting to download data from a selected databin, etc.). Optionally, the one or more GUI mechanisms may prompt the user to specify which data is to be retrieved from the databin (e.g., via a text-box, buttons, menu selections, etc.). The computer 102 may then generate one or more API calls and send the API calls to the server 152.

Responsive to receiving information from the computer 102 indicating that the user seeks to retrieve data from a databin (e.g., via an API, via one or more HTTP requests, etc.), the cloud storage management module 190 locates the databin (e.g., with an ID) and retrieves data from the databin using techniques such as discussed above, according to an embodiment.

Then, the cloud storage management module 190 may return the retrieved data to the computer 102. For example, in an embodiment, the retrieved data may be transmitted by the server 152 to the computer 102 via the network 150. In an embodiment in which the server 152 implements or is coupled to a web server, the web server may generate one or more web pages that include the retrieved data, and may then provide the one or more web pages to the computer 102, as an example. In another embodiment, the server 152 may provide the retrieved data to the computer 102 via an API of a mobile app, as another example. In yet another embodiment, the server 152 may provide the retrieved data to the computer 102 via a connection, as another example.

In some embodiments, a web page associated with a databin may provide a user interface mechanism (e.g., a GUI such as a link, a button, etc.) for causing the answering system 194 (FIG. 1) to analyze the databin and/or data within the databin. Referring again to FIG. 1, in an embodiment, in response to selecting such a GUI mechanism, the computer 102 interacts with the cloud storage management module 190, causing the cloud storage management module 190 to send data from the databin to the answering system 194 and/or to prompt the answering system 194 to retrieve data from the databin. For instance, the GUI may be implemented using a web browser application executed by the computer 102, in an embodiment. As another example, the GUI may be implemented using a mobile app executed by the computer 102, in an embodiment. In embodiments in which the GUI is implemented using a web browser application, the server 152 (or another server communicatively coupled to the server 152) may implement a web server module (not shown in FIG. 1) that serves web pages to the web browser application on the computer 102, and the web pages may provide one or more GUI mechanisms such as described above.

The answering system 194 may be configured to recognize the format of the databin, and may utilize knowledge of the format to analyze the databin and/or contents of the databin. In an embodiment, the answering system 194 may be configured to perform default analyses and/or operations on the databin and/or contents of the databin, such as displaying metadata regarding the databin, displaying content of the databin, plotting contents of the databin, determining and displaying statistical information regarding content of the databin, such as one or more of a median value of contents (such as values associated with a key), an average value of contents (such as values associated with a key), a variance of contents (such as values associated with a key), a minimum value of contents (such as values associated with a key), a standard deviation of contents (such as values associated with a key), a maximum value of contents (such as values associated with a key), a minimum value of contents (such as values associated with a key), etc. In some embodiments, the answering system 194 may include or be coupled to a web server that is configured to generate a web page(s) that displays results of the analyses and/or operations discussed above, and the web server may send the web page(s) to the user computer 102 via the network 150. In some embodiments, the answering system 194 may be configured to send results of the analyses and/or operations discussed above to the server 152, and a web server implemented by or coupled to the server 152 may generate a web page(s) that displays results of the analyses and/or operations discussed above and send the web page(s) to the user computer 102 via the network 150.

Figure 15A:
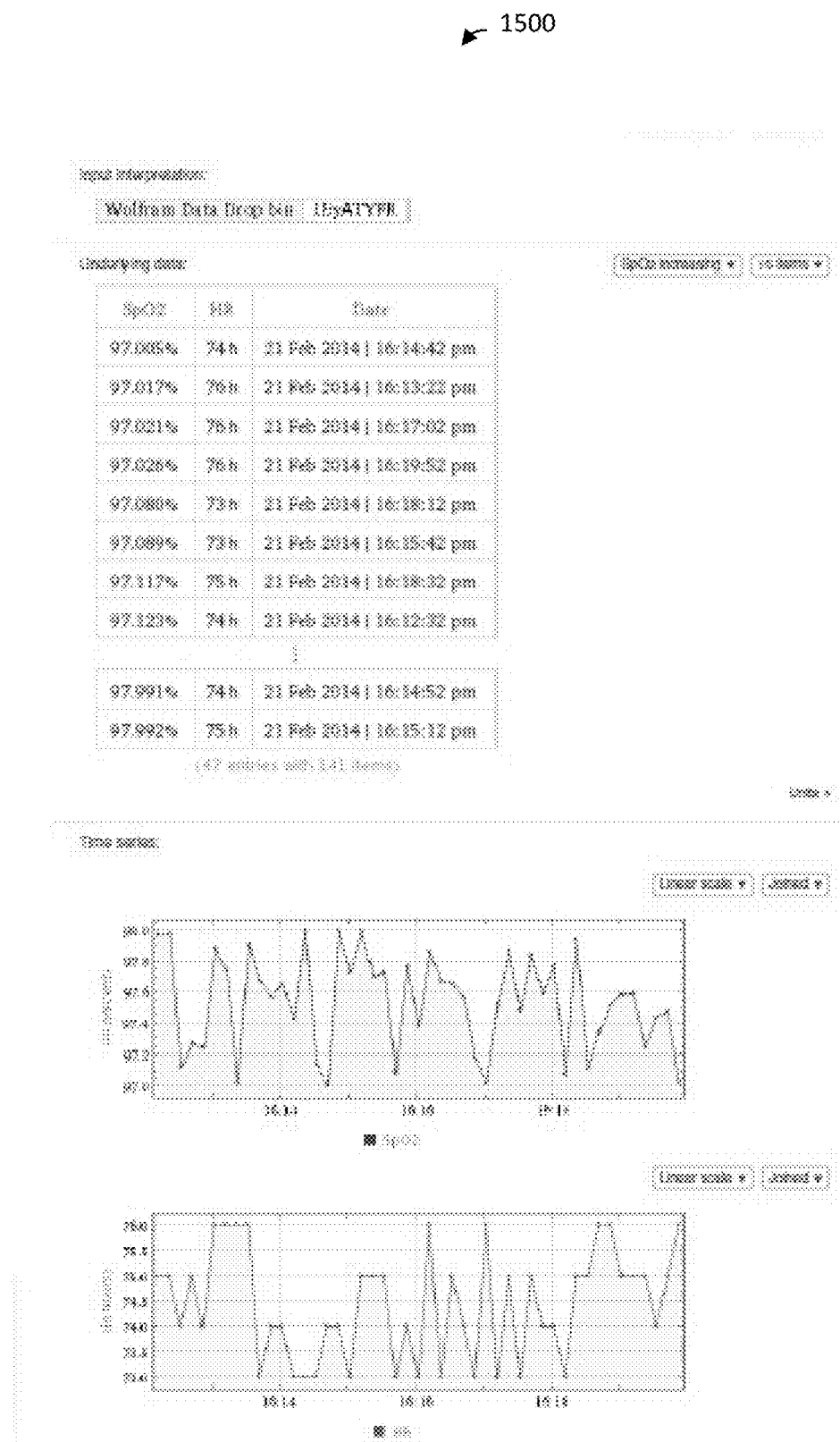
FIGS. 15A and 15B illustrate an example web page that displays results of analyses and/or operations performed on data in an example cloud storage object, according to another embodiment.
Figure 15B:
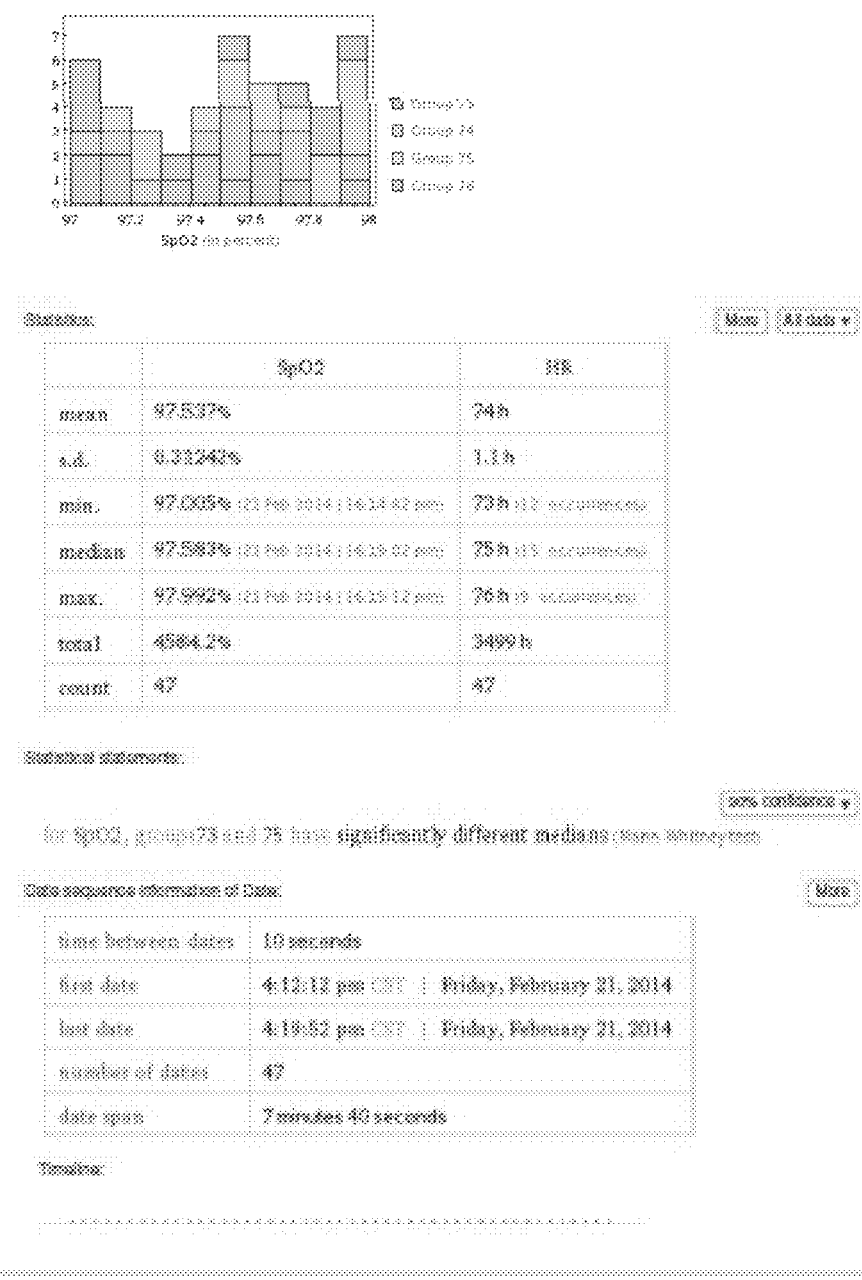

FIGS. 15A and 15B are an illustration of an example web page 1500 that displays results of analyses and/or operations performed on an example databin by an answering system 154, according to an illustrative embodiment.

In some embodiments, the answering system 194 may be configured to perform analyses on the data using techniques such as described in U.S. patent application Ser. No. 13/763,568, filed Feb. 8, 2013 and/or U.S. patent application Ser. No. 14/216,461, filed Mar. 17, 2014.

Accessing Data via Answering System 194

In some embodiments, data in a databin can be accessed using the answering system 194 (FIG. 1), where the answering system 194 provides one or more suitable GUI mechanisms, such as one or more of i) one or more buttons, ii) one or more hypertext links, iii) one or more pull-down menus, iv) one or more pop-up menus, v) one or more text boxes, etc., to enable a user to specify a databin or databins. Referring again to FIG. 1, in an embodiment, in response to a selecting to analyze data from a databin with the GUI, the computer 102 interacts with the answering system 194, causing the answering system 194 to retrieve data from the databin and to perform analyses and/or operations on the databin and/or content in the databin. For instance, the GUI may be implemented using a web browser application executed by the computer 102, in an embodiment. As another example, the GUI may be implemented using a mobile app executed by the computer 102, in an embodiment. In embodiments in which the GUI is implemented using a web browser application, the answering system 194 (or a server communicatively coupled to the answering system 194) may implement a web server module (not shown in FIG. 1) that serves web pages to the web browser application on the computer 102, and the web pages may provide one or more GUI mechanisms such as described above.

The answering system 194 may be configured to recognize the format of the databin, and may utilize knowledge of the format to analyze the databin and/or contents of the databin. In an embodiment, the answering system 194 may be configured to perform default analyses and/or operations on the databin and/or contents of the databin, such as displaying metadata regarding the databin, displaying content of the databin, plotting contents of the databin, determining and displaying statistical information regarding content of the databin, such as one or more of a median value of contents (such as values associated with a key), an average value of contents (such as values associated with a key), a variance of contents (such as values associated with a key), a minimum value of contents (such as values associated with a key), a standard deviation of contents (such as values associated with a key), a maximum value of contents (such as values associated with a key), a minimum value of contents (such as values associated with a key), etc. In some embodiments, the answering system 194 may include or be coupled to a web server that is configured to generate a web page(s) that displays results of the analyses and/or operations discussed above, and the web server may send the web page(s) to the user computer 102 via the network 150.

Figure 16A:
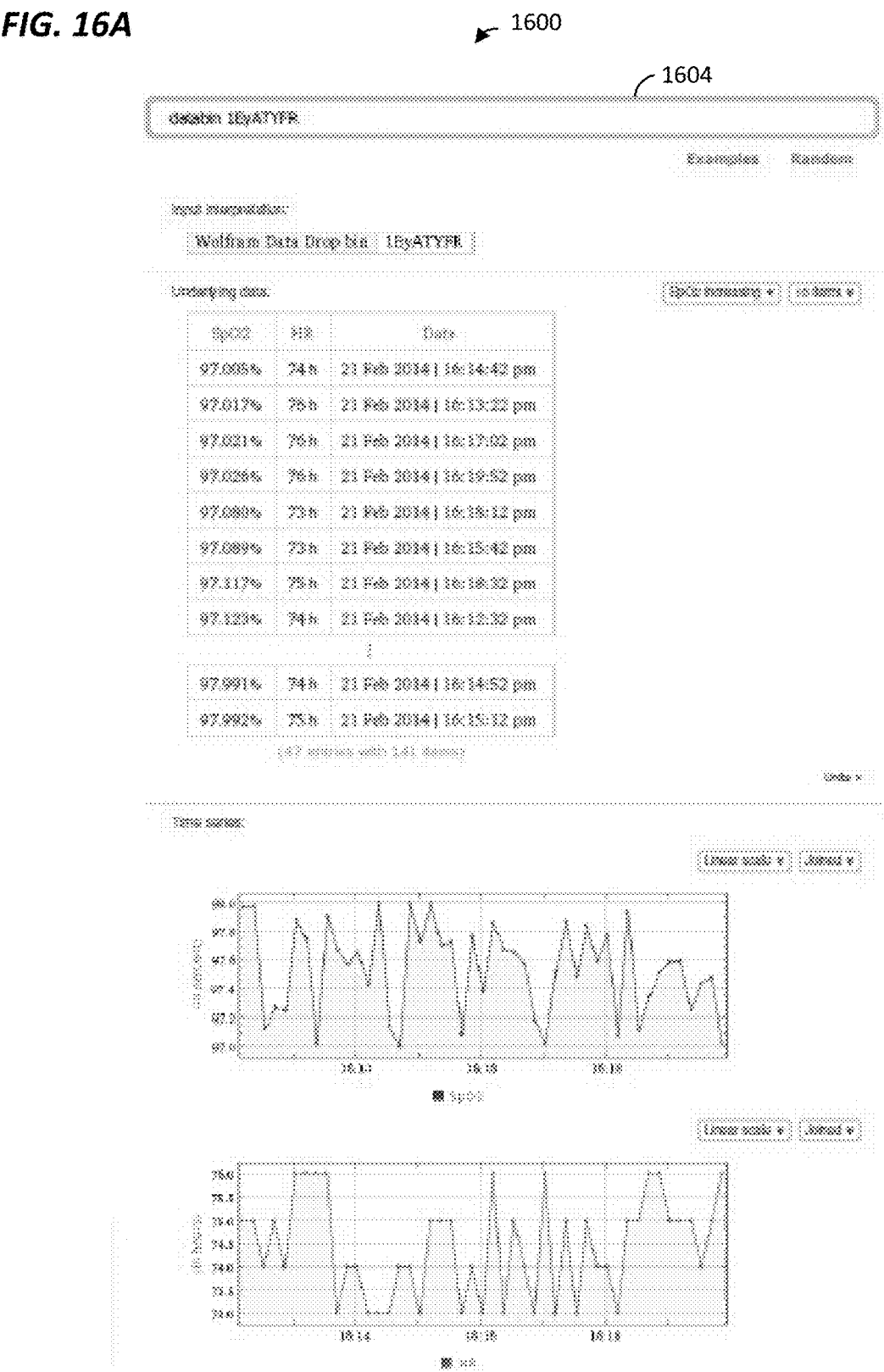
FIGS. 16A and 16B illustrate an example web page that allows a user to select a cloud storage object, and then displays results of analyses and/or operations performed on the cloud storage object, according to another embodiment.
Figure 16B:
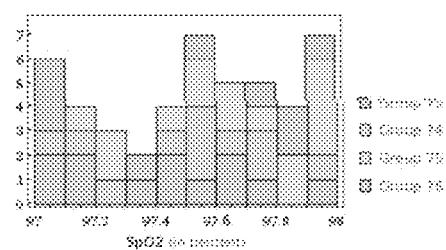

FIGS. 16A and 16B are an illustration of an example web page 1600 that displays results of analyses and/or operations performed on an example databin by an answering system 154, according to an illustrative embodiment. The web page 1600 includes a text box 1604 for entering natural language input to be analyzed by the answering system 194, and a user prompts the answering system 194 to analyze the input in the box 1604 by pressing Enter, selecting a button (not shown), etc. In the example of FIGS. 16A and 16B, the user has entered the text "databin 1EyATYFR", and the answering system 194 interprets this input as a request to analyze data in the databin having the ID 1EyATYFR. In response, answering system 154 accesses the specified databin and performs analyses/operations such as described above. Results of analyses and/or operations performed by the answering system 154 are then displayed in the web page 1600.

Referring again to FIG. 1, in some embodiments, the cloud storage management module 190 may be implemented as a multi-threaded server module to handle high volume and/or high rate accesses to cloud storage objects 184. For example, different threads may handle different requests to access data in databins, in an embodiment. As a more specific example, different threads may handle different requests to access data in a same databin, in an embodiment.

As another example, different threads additionally or alternatively may handle different types of requests regarding the same databin, e.g., different threads may handle requests to add data to a databin and to access data in the same databin.

Deleting Data in Cloud Storage Objects

Referring again to FIG. 1, in some embodiments, the system 100 provides one or more mechanisms for deleting data in databins using techniques similar to techniques described above (or using other suitable techniques). For example, in an illustrative embodiment, data in a databin can be deleted i) programmatically via the computational application 140, ii) via one or more web pages served by a web server module implemented by the server 152 (or another server coupled to the server 152), etc.

In some embodiments, the computational application 140 provides a built-in function and/or built-in mechanisms for deleting data in databins. For example, the computational application 140 may provide a built-in function with a descriptive keyword such as "DeleteDatabinData", where the built-in function is for deleting data in cloud storage objects 184 (e.g., databins). Thus, in some embodiments, a user can utilize the computational application 140 and the DeleteDatabinData function to delete data in cloud storage objects 184 ("databins"). For example, in an embodiment, in response to a user entering the built-in function DeleteDatabinData into a workspace such as a notebook and causing the computational application 140 to evaluate the built-in function (e.g., by pressing "Enter" or taking some other suitable action), the computational application 140 interacts with the cloud storage management module 190, causing the cloud storage management module 190 to delete data from a specified databin. For example, the computational application 140 may evaluate the DeleteDatabinData function entered within the workspace, where a parameter of the DeleteDatabinData function specifies a particular databin. Responsive to the evaluation, computational application 140 may use an API to cause the cloud storage management module 190 to delete data from the specified databin. The cloud storage management module 190 may then send a confirmation to the computational application 140, e.g., using an API, where the confirmation indicates that the data was deleted.

Responsive to receiving information from the cloud storage front end 144 indicating that the user seeks to delete data in a specified databin (e.g., via one or more API calls), the cloud storage management module 190 locates the specified data bin in the cloud storage 180 and deletes data in the databin.

As discussed above, in some embodiments, the DeleteDatabinData function includes an argument that a user can utilize to specify a databin. In an illustrative embodiment, the DeleteDatabinData function has a format as follows:

DeleteDatabinData [bin], where bin is an argument specifying a unique ID associated with a databin. In various embodiments, the argument bin can be of one format or multiple formats, such as one or more of a short ID, a complete UUID, a short URL, a long URL, etc. In some embodiments, the DeleteDatabinData function optionally includes one or more other arguments that a user can utilize to specify which data in the databin are to be deleted. In an illustrative embodiment, the DeleteDatabinData function has a format as follows:

DeleteDatabinData[bin, params], where bin is the argument specifying a unique ID associated with a databin, and params are one or more other parameters specifying which data in the databin are to be deleted. In some embodiments, the one or more other parameters may specify a range of entries in terms of an entry index or index range. In some embodiments, the one or more other parameters may specify a range of entries in terms of time. In some embodiments, the one or more other parameters may specify a range of entries in terms of keys. In various embodiments, parameters for specifying databin entries similar to one, several, or none of the parameters for specifying databin entries described above with respect to the Databin function may be utilized.

The cloud storage management module 190 is configured to utilize the ID in the one or more API calls to locate the specified data bin in the cloud storage 180. Additionally, in some embodiments, the cloud storage management module 190 is configured to utilize other parameters, if present, in the one or more API calls to determine which data in the specified databin are to be deleted. The cloud storage management module 190 then deletes the specified data from the specified databin.

In various embodiments, deleting data from a databin may comprise one or more of deleting raw data, deleting converted data, deleting metadata associated with the data, updating metadata to reflect deletion of data from a databin, etc.

Referring again to FIG. 1, in some embodiments, the cloud storage management module 190 may be implemented as a multi-threaded server module to handle high volume and/or high rate accesses to cloud storage objects 184. For example, different threads may handle different requests to delete data in databins, in an embodiment. As a more specific example, different threads may handle different requests to delete data in a same databin, in an embodiment.

As another example, different threads additionally or alternatively may handle different types of requests regarding the same databin, e.g., different threads may handle requests to add data to a databin, to access data in the same databin, and to delete data in the same databin.

Utilizing Databins with Cloud-Based Development System 188

Referring again to FIG. 1, in some embodiments, databins can be utilized with some or more features provided by the cloud-based development system 188 as described in U.S. patent application Ser. No. 14/549,541, filed Nov. 20, 2014. As merely one illustrative example, the CloudDeploy, Form-Function, and DatabinAdd functions can be utilized to deploy a web form that permits a user or users to add data to a databin.

FIG. 17A illustrates an example programming input 1700 in which a programmer utilizes the CloudDeploy, FormFunction, and DatabinAdd functions to deploy a web form that permits a user or users to add data to a databin. In response, a form generation module of the cloud-based development system 188 generates an electronic form object that, when deployed, includes GUIs for prompting input from a user. The cloud-based development system 188 then deploys the form as a web form accessible via the Internet.

FIG. 17B illustrates an example form 1750 corresponding to an electronic form object generated by the form generation module cloud-based development system 188. The form 1750 includes a pull down menu 1754 for selecting an item from a list, e.g., the list consisting of Breakfast, Lunch, and Dinner. The form 1750 also includes a text box 1758 suitable for entering an integer. The form 1750 further includes a button 1762. In response to the user selecting the button 1762, the electronic form object causes data input by the user via the form 1750 to be added to a specified databin using the DatabinAdd function.

In some embodiments, arguments to functions additionally or alternatively may be in a suitable format different than the formats described above. For example, in some embodiments, arguments to functions may be in formats such as JavaScript Object Notation (JSON), Human-Optimized Config Object Notation (HOCON), YAML, S-expression (symbolic expression), Extensible Markup Language (XML), etc.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for adding data to a cloud storage object for storing data, the method comprising:
    receiving, at one or more processors, one or more messages corresponding to a request to add data to an electronic storage object that is accessible on a network, the one or more messages corresponding to the electronic storage object to which data is to be stored, and including raw data corresponding to the data that is to be stored; and
    responsive to the one or more messages:
        locating, at one or more processors, the electronic storage object in a database,
        identifying, at one or more processors, data conversion metadata in the electronic storage object that indicates how the raw data is to be converted to formatted data in a format that is recognized by a computational application,
        using the data conversion metadata to convert, at one or more processors, the raw data to the formatted data in the format recognized by the computational application, and
        storing the formatted data to the electronic storage object in the database.

2. The method of claim 1, wherein:
    receiving the one or more messages comprises receiving one or more application programming interface (API) calls requesting adding of data to the data to the electronic storage object, the one or more API calls including a parameter specifying the electronic storage object; and
    locating the electronic storage object includes using the parameter to locate the electronic storage object.

3. The method of claim 1, further comprising:
    establishing, with one or more processors, a connection according to a communication protocol;
    wherein the raw data is received via the connection.

4. The method of claim 1, further comprising:
    storing the raw data to the electronic storage object in the database responsive to the one or more messages.

5. The method of claim 4, wherein using the data conversion metadata to convert the raw data to the formatted data in the format recognized by the computational application, and storing the formatted data to the electronic storage object are performed after the raw data is stored to the electronic storage object.

6. The method of claim 5, wherein using the data conversion metadata to convert the raw data to the formatted data in the format recognized by the computational application, and storing the formatted data to the electronic storage object are performed by a background process and also in response to the background process determining that the electronic storage object includes raw data has not yet been converted to formatted data.

7. The method of claim 5, wherein using the data conversion metadata to convert the raw data to the formatted data in the format recognized by the computational application, and storing the formatted data to the electronic storage object are performed also in response to i) receiving a request to access the electronic storage object and ii) determining that the electronic storage object includes raw data that has not yet been converted to formatted data.

8. The method of claim 1, wherein:
    locating the electronic storage object includes locating an electronic file system structure corresponding to the electronic storage object;
    identifying the data conversion metadata in the electronic storage object includes analyzing a metadata file in the electronic file system structure, the metadata file storing the data conversion metadata; and
    storing the formatted data includes storing the formatted data to a data file in the electronic file system structure.

9. The method of claim 8, further comprising:
    storing the raw data to the data file in the electronic file system structure responsive to the one or more messages.

10. The method of claim 1, wherein the data conversion metadata specify one or more data types to which the raw data is to be converted, among a plurality of data types recognized by the computational application.

11. The method of claim 1, wherein:
    the one or more messages include a key-value association for at least some of the raw data
    the method further includes, responsive to the one or more messages:
        identifying, at one or more processors, key-value association metadata in the electronic storage object that indicates how formatted data is to be associated with keys in the electronic storage object, and using the key-value association metadata to store formatted data in the electronic storage object so that at least some of the formatted data in the electronic storage object is associated with one or more keys.

12. The method of claim 1, further comprising, responsive to the one or more messages:
identifying, at one or more processors, function metadata in the electronic storage object that indicates one or more processing functions to be performed on the raw data and/or the formatted data, and
performing, at one or more processors, the one or more processing functions on the raw data and/or the formatted data indicated by the function metadata in the electronic storage object.

13. The method of claim 1, wherein:
the raw data is first raw data;
the formatted data is first formatted data; and
the method further comprises:
receiving, at one or more processors, an email corresponding to a request to add data to the electronic storage object, the email including i) a parameter specifying the electronic storage object to which data is to be stored, and ii) second raw data, and
responsive to the email:
locating, at one or more processors, the electronic storage object in the database using the parameter,
identifying, at one or more processors, the data conversion metadata in the electronic storage object,
using the data conversion metadata to convert, at one or more processors, the second raw data to second formatted data, and
storing the second formatted further data to the electronic storage object in the database.

14. The method of claim 13, wherein:
the parameter is a first parameter;
the one or more messages are one or more first messages; and
the method further comprises:
obtaining, at one or more processors, a second message from a messaging application server using an application programming interface (API) of the messaging application, the second message corresponding to a request to add data to the electronic storage object, the second message including i) a second parameter specifying the electronic storage object to which data is to be stored, and ii) third raw data, and
responsive to the second message:
locating, at one or more processors, the electronic storage object in the database using the second parameter,
identifying, at one or more processors, the data conversion metadata in the electronic storage object,
using the data conversion metadata to convert, at one or more processors, the third raw data to third formatted data, and
storing the third formatted further data to the electronic storage object in the database.

15. The method of claim 13, wherein:
the parameter is a first parameter; and
the method further comprises:
receiving, at one or more processors and via a web server, one or more application programming interface (API) calls corresponding to the request to add data to the electronic storage object, the one or more API calls including i) a second parameter specifying the electronic storage object to which data is to be stored, and ii) third raw data, and
responsive to the one or more API calls:
locating, at one or more processors, the electronic storage object in the database using the second parameter,
identifying, at one or more processors, the data conversion metadata in the electronic storage object,
using the data conversion metadata to convert, at one or more processors, the third raw data to third formatted data, and
storing the third formatted data to the electronic storage object in the database.

16. The method of claim 1, wherein:
receiving, at one or more processors, one or more application programming interface (API) calls requesting access to data in the electronic storage object, the one or more API calls including a parameter specifying the electronic storage object; and
responsive to the one or more API calls:
locating, at one or more processors, the electronic storage object in the database using the parameter,
retrieving, at the one or more processors, data from the electronic storage object; and
forwarding, with the one or more processors, the retrieved data in the format recognized by the computational application, the retrieved data forwarded to a computer via the network or another network, wherein the computer executes the computational application.

17. The method of claim 16, wherein:
the parameter is a first parameter;
the one or more API calls include one or more or more second parameters that indicate which data within the electronic storage object are to be retrieved;
the method further includes determining, at one or more processors, which data within the electronic storage object are to be retrieved using the one or more second parameters; and
retrieving data from the electronic storage object comprises retrieving the data within the electronic storage object determined using the one or more or more second parameters.

18. The method of claim 17, wherein:
the one or more or more second parameters indicate a range of entries within the electronic storage object that are to be retrieved; and
retrieving data from the electronic storage object comprises
identifying the indicated range of entries using the one or more or more second parameters, and
retrieving the identified data.

19. The method of claim 18, wherein:
the one or more or more second parameters include an integer indicating a number of entries in the range; and
retrieving data from the electronic storage object comprises
identifying the integer number of entries using the one or more or more second parameters, and
retrieving the identified entries.

20. The method of claim 18, wherein:
the one or more or more second parameters include one or more dates and/or times corresponding to the range; and
retrieving data from the electronic storage object comprises identifying entries falling with the range corresponding to the one or more dates and/or times, and
retrieving the identified entries.

21. The method of claim 17, wherein:
data in the electronic storage object is categorized according to key-value associations;
the one or more or more second parameters indicate that data corresponding to one or more keys are to be retrieved; and
retrieving data from the electronic storage object comprises
identifying entries corresponding to the one or more keys, and
retrieving the identified entries.

22. The method of claim 16, wherein:
the computational application utilizes a uniform format in which i) a plurality of other data and ii) functions in the document are represented as symbolic expressions; and
the retrieved data forwarded to the computer are in the uniform format and represented as a symbolic expression.

23. A system, comprising:
a network interface device configured to support communications via a communication network;
a network-accessible computer storage system;
one or more processors coupled to the network interface device and the network-accessible computer storage system; and
one or more memory devices coupled to the one more processors, the one or more memory devices storing machine readable instructions that, when executed by the one or more processors, cause the one or more processors to:
receive, via the network interface device, one or more messages corresponding to requests to add data to an electronic storage object that is accessible on a network, the one or more messages corresponding to the electronic storage object to which data is to be stored, and including raw data corresponding to the data that is to be stored; and
responsive to the one or more messages:
locate the electronic storage object in the network-accessible computer storage system,
identify data conversion metadata in the electronic storage object that indicates how the raw data is to be converted to formatted data in a format that is recognized by a computational application,
use the data conversion metadata to convert the raw data to the formatted data in the format recognized by the computational application, and
store the formatted data to the electronic storage object in the network-accessible computer storage system.

24. The system of claim 23, wherein the one or more memory devices further store machine readable instructions that, when executed by the one or more processors, cause the one or more processors to:
receive one or more application programming interface (API) calls requesting adding of data to the data to the electronic storage object, the one or more API calls including a parameter specifying the electronic storage object; and
use the parameter to locate the electronic storage object.

25. The system of claim 23, wherein the one or more memory devices further store machine readable instructions that, when executed by the one or more processors, cause the one or more processors to:
establish a connection according to a communication protocol;
wherein the raw data is received via the connection.

26. The system of claim 23, wherein the one or more memory devices further store machine readable instructions that, when executed by the one or more processors, cause the one or more processors to:
store the raw data to the electronic storage object in the network-accessible computer storage system responsive to the one or more messages.

27. The system of claim 26, wherein using the data conversion metadata to convert the raw data to the formatted data in the format recognized by the computational application, and storing the formatted data to the electronic storage object are performed after the raw data is stored to the electronic storage object.

28. The system of claim 27, wherein using the data conversion metadata to convert the raw data to the formatted data in the format recognized by the computational application, and storing the formatted data to the electronic storage object are performed by a background process, executed by the one or more processors, and also in response to the background process determining that the electronic storage object includes raw data has not yet been converted to formatted data.

29. The system of claim 27, wherein using the data conversion metadata to convert the raw data to the formatted data in the format recognized by the computational application, and storing the formatted data to the electronic storage object are performed also in response to i) receiving a request to access the electronic storage object and ii) determining that the electronic storage object includes raw data that has not yet been converted to formatted data.

30. The system of claim 23, wherein:
locating the electronic storage object includes locating an electronic file system structure corresponding to the electronic storage object;
identifying the data conversion metadata in the electronic storage object includes analyzing a metadata file in the electronic file system structure, the metadata file storing the data conversion metadata; and
storing the formatted data includes storing the formatted data to a data file in the electronic file system structure.

31. The system of claim 30, wherein the one or more memory devices further store machine readable instructions that, when executed by the one or more processors, cause the one or more processors to:
store the raw data to the data file in the electronic file system structure responsive to the one or more messages.

32. The system of claim 23, wherein the data conversion metadata specify one or more data types to which the raw data is to be converted, among a plurality of data types recognized by the computational application.

33. The system of claim 23, wherein:
the one or more messages include a key-value association for at least some of the raw data
the one or more memory devices further store machine readable instructions that, when executed by the one or more processors, cause the one or more processors to, responsive to the one or more messages:
identify key-value association metadata in the electronic storage object that indicates how formatted data is to be associated with keys in the electronic storage object, and
use the key-value association metadata to store formatted data in the electronic storage object so that at least some of the formatted data in the electronic storage object is associated with one or more keys.

34. The system of claim 23, wherein the one or more memory devices further store machine readable instructions that, when executed by the one or more processors, cause the one or more processors to, responsive to the one or more messages:
identify function metadata in the electronic storage object that indicates one or more processing functions to be performed on the raw data and/or the formatted data, and
perform the one or more processing functions on the raw data and/or the formatted data indicated by the function metadata in the electronic storage object.

35. The system of claim 23, wherein the one or more memory devices further store machine readable instructions that, when executed by the one or more processors, cause the one or more processors to:
execute an email server configured to:
receive an email corresponding to a request to add data to the electronic storage object, the email including i) a parameter specifying the electronic storage object to which data is to be stored, and ii) the raw data, and
responsive to the email, generate the one or more messages to include the parameter and the raw data;
wherein the one or more memory devices further store machine readable instructions that, when executed by the one or more processors, cause the one or more processors to:
responsive to the one or more messages, locate the electronic storage object in the network-accessible computer storage system using the parameter.

36. The system of claim 23, wherein:
the one or more messages are one or more first messages; and
the one or more memory devices further store machine readable instructions that, when executed by the one or more processors, cause the one or more processors to:
execute a messaging application module configured to:
obtain, from a messaging application server using an application programming interface (API) of a messaging application, a second message corresponding to a request to add data to the electronic storage object, the second message including i) a parameter specifying the electronic storage object to which data is to be stored, and ii) the raw data, and
responsive to the second message, generate the one or more first messages to include the parameter and the raw data;
wherein the one or more memory devices further store machine readable instructions that, when executed by the one or more processors, cause the one or more processors to:
responsive to the one or more first messages, locate the electronic storage object in the network-accessible computer storage system using the parameter.

37. The system of claim 23, wherein the one or more memory devices further store machine readable instructions that, when executed by the one or more processors, cause the one or more processors to:
execute a web server application configured to:
generate one or more web pages that prompt a user to provide i) a parameter specifying the electronic storage object to which data is to be stored, and ii) the raw data,
responsive to prompting the user, receive i) the parameter, and ii) the raw data, and
responsive to receiving i) the parameter, and ii) the raw data, generate the one or more messages to include the parameter and the raw data;
wherein the one or more memory devices further store machine readable instructions that, when executed by the one or more processors, cause the one or more processors to:
responsive to the one or more messages, locate the electronic storage object in the network-accessible computer storage system using the parameter.

* * * * *